(12) United States Patent
Colby et al.

(10) Patent No.: US 7,183,667 B2
(45) Date of Patent: *Feb. 27, 2007

(54) METHOD AND APPARATUS FOR POWER INVERTER SYNCHRONIZATION

(75) Inventors: Roy Stephen Colby, Raleigh, NC (US); Mark John Kocher, Raleigh, NC (US); Gerald Benjamin Carson, Raleigh, NC (US)

(73) Assignee: Square D Company, Palatine, IL (US)

( * ) Notice: Subject to any disclaimer, the term of this patent is extended or adjusted under 35 U.S.C. 154(b) by 487 days.

This patent is subject to a terminal disclaimer.

(21) Appl. No.: 10/741,905

(22) Filed: Dec. 19, 2003

(65) Prior Publication Data

US 2005/0135031 A1 Jun. 23, 2005

(51) Int. Cl.
*H02J 3/16* (2006.01)

(52) U.S. Cl. .............................. 307/19; 307/31; 307/51

(58) Field of Classification Search .................. 307/19
See application file for complete search history.

(56) References Cited

U.S. PATENT DOCUMENTS

| | | | | |
|---|---|---|---|---|
| 5,255,176 A | | 10/1993 | Hatta et al. .................... | 363/95 |
| 5,642,006 A | * | 6/1997 | Cech ........................... | 307/87 |
| 6,072,302 A | * | 6/2000 | Underwood et al. .......... | 322/17 |
| 6,198,176 B1 | * | 3/2001 | Gillette ........................ | 307/64 |
| 6,219,623 B1 | * | 4/2001 | Wills .......................... | 702/60 |
| 6,304,468 B2 | | 10/2001 | Ichinose et al. .............. | 363/55 |
| 6,380,719 B2 | * | 4/2002 | Underwood et al. .......... | 322/36 |
| 7,015,597 B2 | * | 3/2006 | Colby et al. .................. | 307/31 |
| 2001/0048290 A1 | * | 12/2001 | Underwood et al. .......... | 322/20 |
| 2001/0052704 A1 | * | 12/2001 | Bosley et al. ................. | 290/52 |

FOREIGN PATENT DOCUMENTS

| | | |
|---|---|---|
| DE | 4011049 A1 | 10/1991 |
| DE | 19949997 | 6/2001 |
| FR | 2831349 | 4/2003 |
| JP | 08103085 | 4/1996 |
| JP | 2001 231157 | 8/2001 |

\* cited by examiner

*Primary Examiner*—Burton S. Mullins
*Assistant Examiner*—Adi Amrany

(57) ABSTRACT

A control circuit synchronizes an ac power inverter to the mains voltage of an electrical grid by matching the fundamental phasor components of the inverter's output voltage to the fundamental phasor components of the mains voltage. Once such matching meets an acceptable voltage error threshold, the control circuit initiates contactor closure, verifies contactor closure, and then initiates a changeover from voltage-mode control used in synchronization operations to a current-mode control of the inverter's output. The control circuit provides corresponding disconnection control when disconnection from the grid is desired, wherein the regulated power of the inverter is ramped down in controlled fashion until it reaches a lower threshold whereupon contactor opening is initiated. Once contactor opening is verified, regulation control reverts to stand-alone voltage mode control or to shut down, as needed or desired.

52 Claims, 13 Drawing Sheets

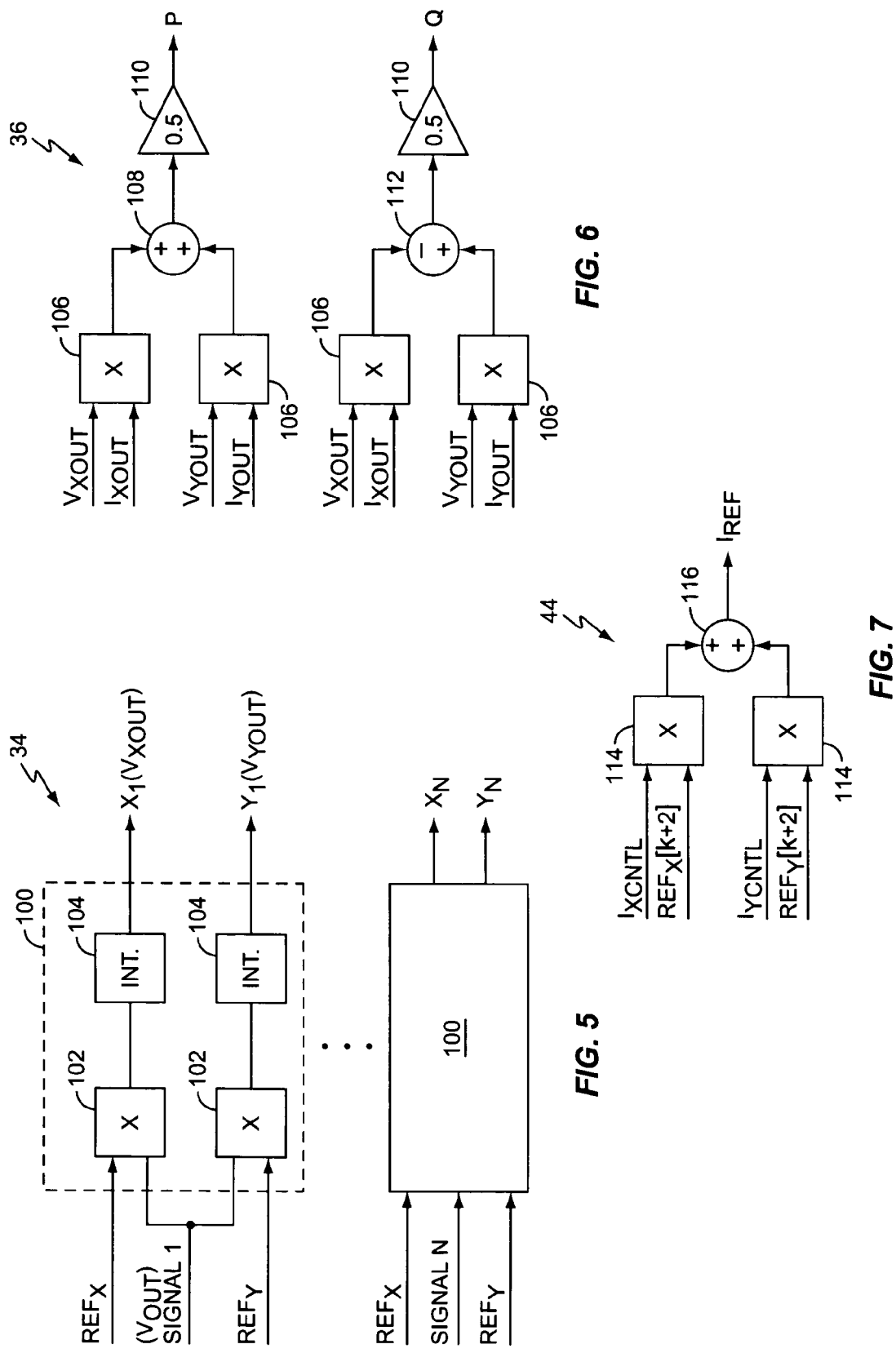

METHOD AND APPARATUS FOR POWER INVERTER SYNCHRONIZATION

BACKGROUND OF THE INVENTION

The present invention generally relates to ac power control, and particularly relates to synchronization of ac power inverters.

Increasing use of localized power sources in residential and industrial settings coincides with the increasing desire to exploit potentially cheaper, cleaner, or more reliable alternative energy sources. Historically, individuals and businesses relied on central generation stations with power transmission and distribution networks, i.e., the traditional "grid," almost exclusively but the developing trend is toward a number of smaller generating units, distributed geographically close to the loads. Local power generation using power sources such as photovoltaic systems, fuel cells, etc., also is becoming a viable option for businesses and homeowners. These local power generating systems can be configured as stand-alone systems that operate as the exclusive source of power for their local loads or they can be interconnected with the grid.

More commonly, these local power generating systems are configured as grid-connected systems that provide an opportunity for co-generation wherein power can be taken from the grid or provided to the grid. A grid-connected system allows a local load to remain connected both to the local system and to the power grid. In a typical setup, a local load is connected in parallel to an ac power inverter and to a utility grid. The load can be powered solely by the inverter, by the grid, or can receive a portion of its power from both.

Synchronization of the inverter to the grid is a prerequisite for changing from stand-alone mode to grid-connected mode. That is, the inverter's voltage must be matched in amplitude and phase to the voltage of the grid before electrically connecting the inverter to the grid.

SUMMARY OF THE INVENTION

The present invention comprises a method and apparatus to control the interconnection of a power inverter with an electrical system, such as an electrical distribution system, e.g., a utility grid. Broadly, a control circuit locks to the phase of the ac mains voltage and then adjusts the fundamental phasor components of the inverter's output voltage to match the measured fundamental phasor components of the grid voltage. Once matching is achieved within a defined tolerance, interconnecting contactors are commanded closed and, after verifying contactor closure, regulation of the inverter's output is changed over from voltage regulation to power/current regulation, wherein the inverter's output is controlled as a function of desired real and reactive power output.

Thus, an exemplary method comprises controlling an inverter voltage to match an electrical system voltage, detecting synchronization of the inverter voltage with the electrical system voltage based on calculating a voltage error between x-y phasor components of the inverter and electrical system voltages, and commanding contactor closure to interconnect the power inverter with the electrical system responsive to detecting synchronization. Initially connecting the inverter to the grid or other system thus comprises adjusting the inverter's voltage to match the grid's voltage, and then closing connecting contactors based on detecting that the voltage matches within allowable limits.

An exemplary method can further include verifying contactor closure by monitoring one or more feedback signals and changing the inverter from voltage regulation to power/current regulation responsive to verifying contactor closure. Contactor closure can be verified by measuring harmonic current flow between the inverter and the electrical system, for example, or by monitoring other feedback signals that indicate contactor status (open or closed).

An exemplary method of interconnection control can include controlled disconnection of the inverter from an electrical system. A controlled disconnect of the inverter can be performed by ramping down inverter power, and subsequently commanding contactor opening to disconnect the inverter from the electrical system responsive to determining that the inverter power is below a defined threshold. The inverter can be stopped after opening the contactors. In a related method of interconnection control, the contactor(s) can be opened responsive to detecting a grid failure or "island" condition, and the inverter can be switched to a stand-alone (free-running) mode and then, if desired, re-synchronized with and re-connected to the grid once the grid is restored.

According to one or more embodiments of the present invention, an exemplary power inverter includes a control circuit to control interconnection of a power inverter with an electrical system. An exemplary control circuit, which can be implemented in hardware, software, or some combination thereof, includes a regulator circuit to control an inverter voltage to match an electrical system voltage by measuring x-y phasor components of the inverter voltage and the electrical system voltage, a synchronization detection circuit to detect synchronization of the inverter voltage with the electrical system voltage by calculating a voltage error based on the x-y phasor components, and a contactor control circuit to command contactor closure to interconnect the inverter with the electrical system responsive to detecting synchronization.

In at least one embodiment, the power inverter comprises a single-phase power inverter that is interconnected in controlled fashion with a single-phase electrical system. In single-phase embodiments, the control circuit is configured to control inverter voltage relative to the electrical system voltage based on measuring x-y phasor components of single-phase inverter and electrical system voltage waveforms. Exemplary single-phase x-y phasor measurement comprises sampling in-phase (x) and quadrature (y) phasor components of the inverter and electrical system voltage waveforms over half-cycles of a fundamental waveform period. The x-y coordinate frame for such measurements can be referenced to a phase of the electrical system voltage.

In one or more embodiments, the control circuit at least comprises a synchronization detection circuit to initiate contactor closure to connect the inverter to the electrical system responsive to determining that an inverter voltage substantially matches an electrical system voltage, and a closure detection circuit to verify contactor closure based on measuring harmonic current flow between the inverter and the electrical system. Closure detection can be used as a positive indication of physical interconnection with the electrical system, and regulation of the power inverter can be modified after connection verification, such as by regulating the inverter current for a desired net real and reactive power flow between the inverter and the electrical system.

BRIEF DESCRIPTION OF THE DRAWINGS

FIG. 5 is a diagram of an exemplary phasor calculator.

FIG. 6 is a diagram of an exemplary phasor-based power calculator.

FIG. 7 is a diagram of an exemplary phasor-to-ac waveform generator.

DETAILED DESCRIPTION OF THE INVENTION

Figure 1A:
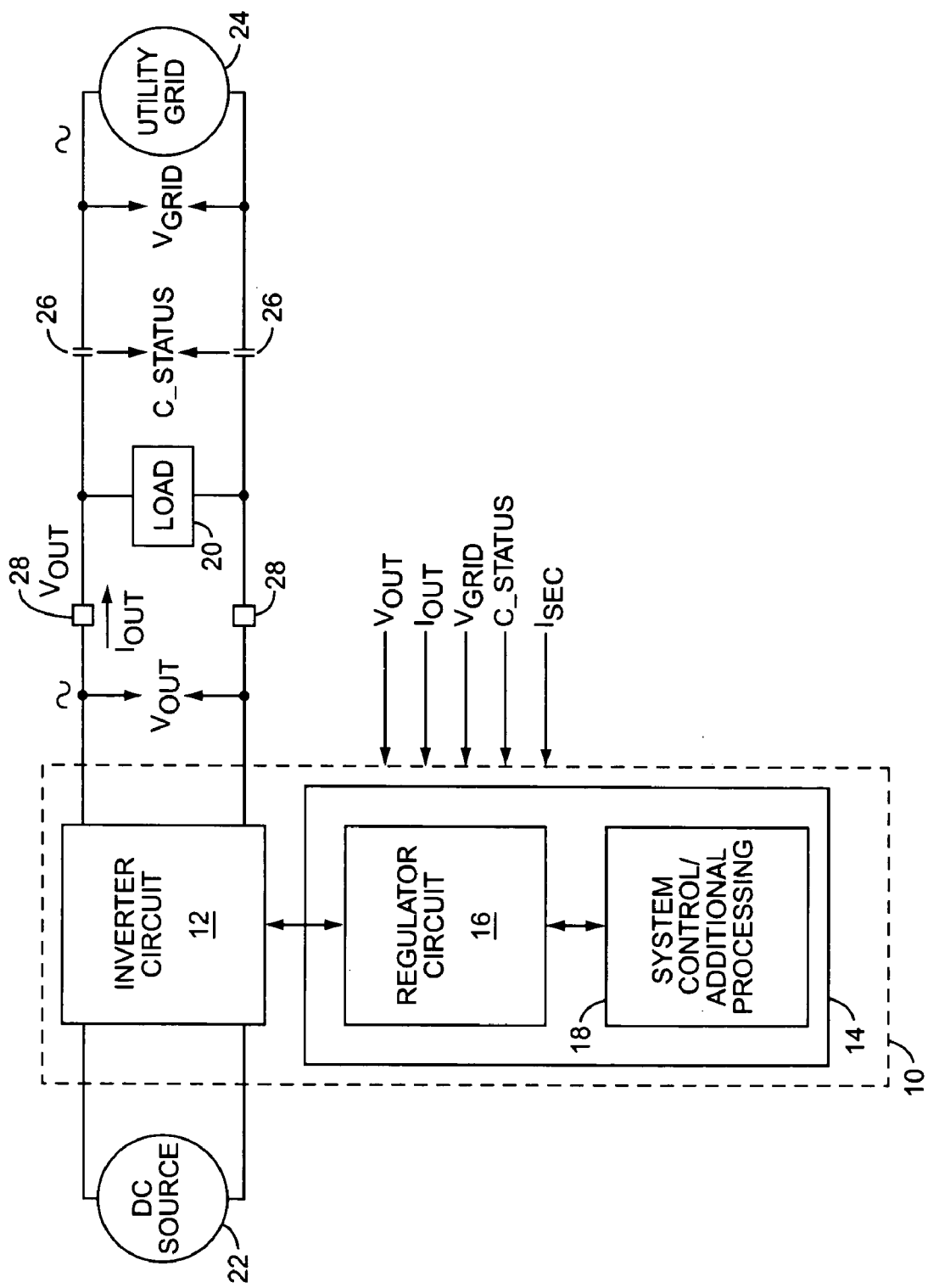
FIGS. 1A, 1B, and 1C are diagrams of an ac power inverter according to one or more exemplary embodiments of the present invention.

FIG. 1A illustrates an exemplary ac power inverter 10 in which the present invention can be practiced. Inverter 10 comprises an inverter circuit 12 and a control circuit 14, which can include multiple functional circuits, including a regulator circuit 16, and one or more additional processing and system control circuits 18.

Inverter 10 provides ac power to a load 20 based on converting dc power provided by a local dc source 22 into ac power at the desired voltage and frequency. The load 20 can be connected in parallel with an external power system 24, e.g., a utility grid, through contactors 26. Complementing its operation in this arrangement, inverter 10 can be configured to receive a number of feedback/detection signals, including signals corresponding to its output voltage ($V_{OUT}$) and current ($I_{OUT}$), the grid voltage ($V_{GRID}$), the contactor status (C_STATUS), and to a secondary winding current ($I_{SEC}$) that is illustrated in FIG. 1B.

Figure 1B:
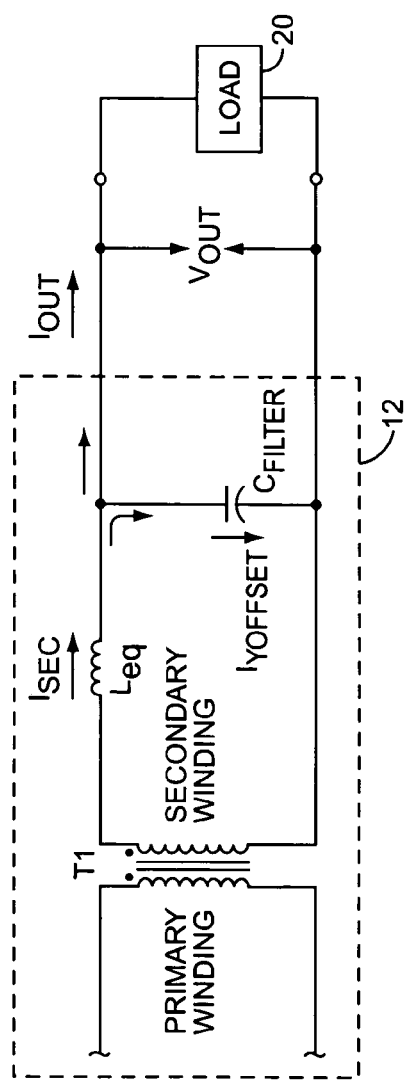

FIG. 1B does not depict the entire inverter circuit 12 but illustrates that an exemplary inverter circuit 12 includes an output transformer T1 comprising primary and secondary windings, and further includes an output filter formed by a filter inductor, $L_{eq}$, and a filter capacitor, $C_{FILTER}$. The filter inductance can be a separate element (component), or can be the leakage inductance of transformer T1. Use of the output filter attenuates the higher frequency components in the inverter's output that naturally arise from Pulse Width Modulation (PWM) based or other switching based dc-to-ac conversion operations implemented by it. One notes that the secondary current, $I_{SEC}$, comprises the inverter output current, $I_{OUT}$, plus the filter current, i.e., the portion of the secondary winding current diverted through $C_{FILTER}$.

Both $I_{SEC}$ and $I_{OUT}$ can be sensed using Current Transformers (CT's) 28 or other types of current measurement sensors. Regardless of how it is sensed, $I_{OUT}$ indicates current flowing into or out of the inverter 10. Note that $I_{OUT}$ can be sensed inferentially, such as by measuring the secondary winding current of transformer T1 rather than directly measuring it using current transformers (CTs) 28.

Figure 1C:
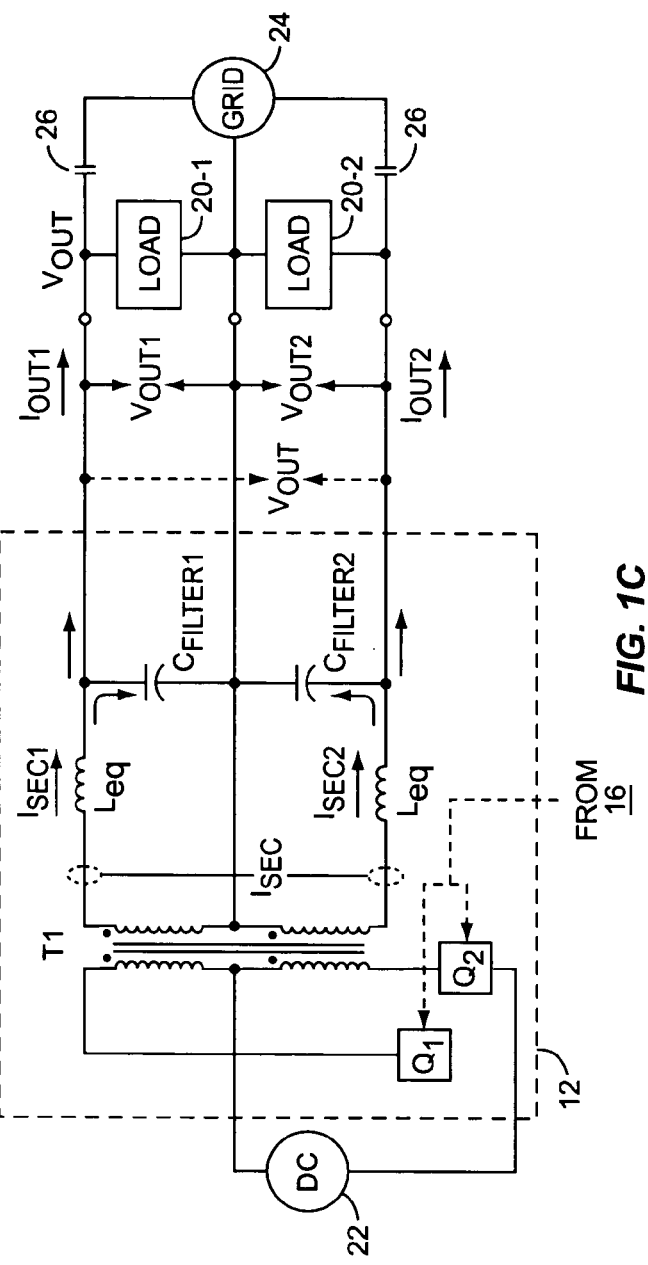

FIG. 1C illustrates an exemplary embodiment configured for three-wire (two line-to-neutral pairs) as typically is used in "service entrance" connections between local loads 20-1 and 20-2 and the grid 24 in the United States, for example. The output transformer T1 comprises split primary and secondary windings, with the neutral wire electrically connected to the center tap of the secondary winding such that one half of the transformer's secondary winding provides $I_{OUT1}$ and $V_{OUT1}$ to load 20-1, and the other half provides $I_{OUT2}$ and $V_{OUT2}$ to load 20-2. Thus, with this configuration, inverter 10 effectively provides two output phases, although the phase voltage in one phase tracks the other and both loads 20-1 and 20-2 see the same line-to-neutral voltage levels.

Secondary winding current comprises $I_{SEC1}$ plus $I_{SEC2}$ and, likewise, the inverter's output current $I_{OUT}$ comprises $I_{OUT1}$ plus $I_{OUT2}$, and its output voltage, $V_{OUT}$ comprises $V_{OUT1}$ plus $V_{OUT2}$. Thus, even where inverter 10 is configured for a three-wire output circuit as shown, the overall control method can be based on the total currents and voltages taken across the two phases and the overall inverter control effectively operates as a single-phase control. That is, inverter 10 can base its regulation control on the summation of currents and voltages in the two phases. With that method, the total current and voltage is controlled according to exemplary methods described herein, and the differences between loads 20-1 and 20-2 determine how the total current splits between the phases.

When operating in Grid Parallel mode (assuming that the grid's voltage and frequency are within nominal ranges) inverter 10 controls its output to match the grid 24. In an exemplary overall control method, inverter 10 controls or regulates its output voltage waveform ($V_{OUT}$) to match the amplitude and phase of the grid voltage, which amounts to tracking and matching the grid's voltage and frequency. Inverter 10 thus can monitor line voltage and frequency and use them to maintain its output. Of course, if inverter 10 detects out-of-range grid conditions, it can open contactors 26 and operate in Stand Alone mode until it detects that nominal grid conditions have been restored.

Inverter 10 embodies an advantageous output control method that is based on separate control of the real and reactive power output by inverter 10. In an exemplary embodiment, which can be implemented almost entirely in the digital domain, inverter 10 calculates its real and reactive output power based on calculating x-y phasors for its output voltage and current waveforms, which can be digitized. It generates an inverter control signal, e.g., a PWM-based switching control signal for inverter circuit 12, to adjust the inverter's output based on the differences between measured real and reactive power and desired values for real and reactive power.

In Stand Alone mode, the voltage waveform can be regulated as needed or desired and the power draw is determined by the load, but in Grid Parallel mode, the desired values can be referenced to the grid and adjusted for the desired net power flow between the inverter 10 and the grid 24. To that end, inverter 10 can receive a feedback or other measurement signal from a sensor measuring net power flow at a service entrance or other point of interconnection between the inverter 10 and the grid 24. Inverter 10 can thus be configured to sense whether it is injecting power into the grid 24 or drawing power from it.

Figure 2A:
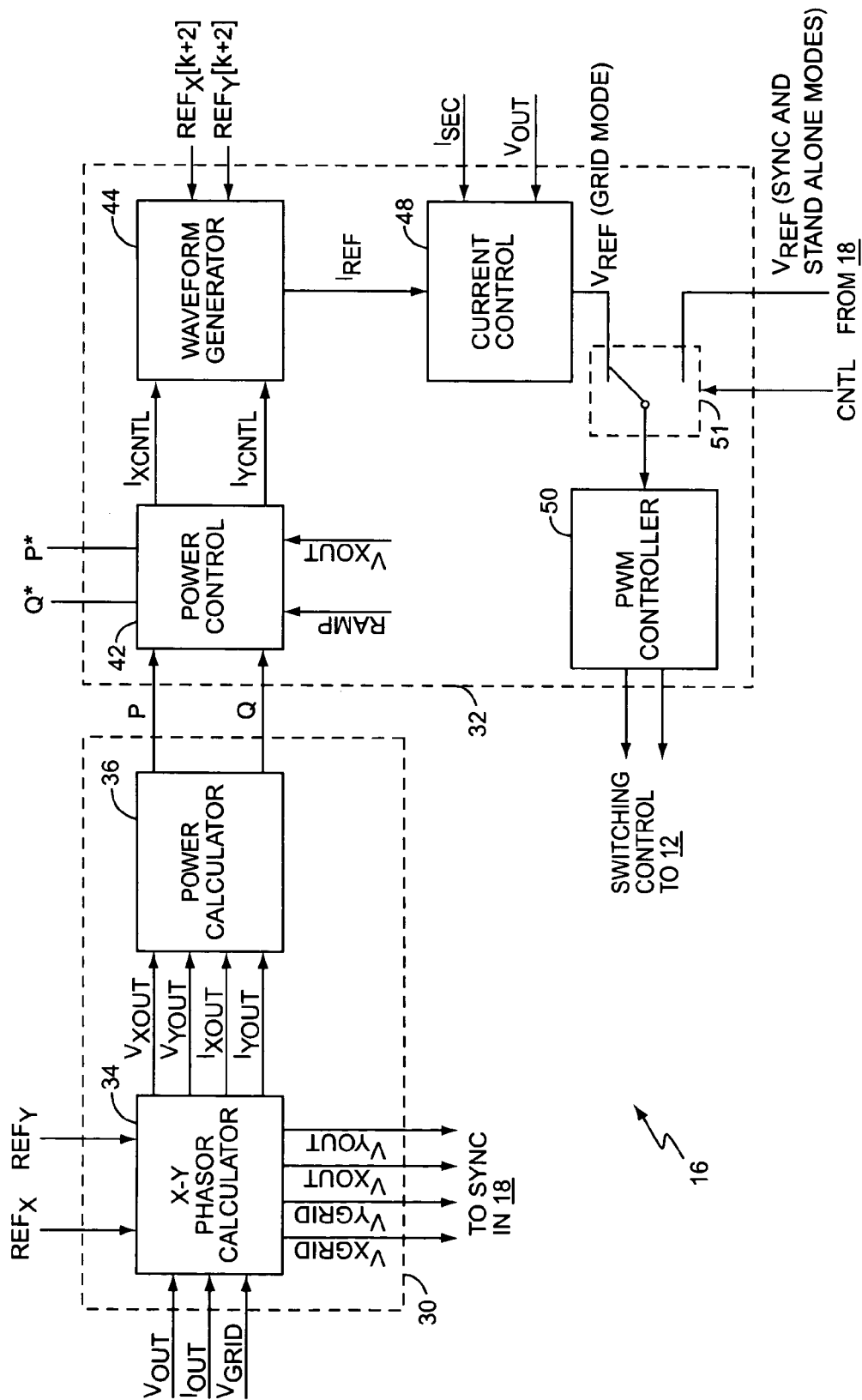
FIGS. 2A and 2B are diagrams of exemplary phasor-based inverter regulator circuits.

FIG. 2A illustrates an exemplary regulator circuit 16, which can be configured to control inverter 10 based on real and reactive power control as described above. In an exemplary embodiment, regulation of the inverter's output comprises an outer control loop driven by differences in measured and desired values of real and reactive inverter power output, and an inner loop driven by control inputs generated by the outer loop, and by voltage and current feedback from the inverter.

More particular, an exemplary regulator 16 generates current commands ($I_{XCNTL}$ and $I_{YCNTL}$) based on the differences between measured and desired real and reactive power and from them generates a reference current waveform, $I_{REF}$. The $I_{REF}$ signal, which can be generated in terms of x and y components, is then used to set a reference voltage, $V_{REF}$, that is updated via the control to produce desired changes in the inverter current. These exemplary control processes are detailed below.

An exemplary regulator 16 comprises a measurement circuit 30 and a feedback control circuit 32. The exemplary measurement circuit 30 includes a phasor calculator 34 and a power calculator 36. The exemplary feedback control circuit 32 includes a power controller 42, a waveform generator 44, current controller 48, and an inverter circuit switching controller 50, e.g. a PWM signal generator. A logical switch 51 can be used to control whether the switching controller 50 is driven by the current controller 48, as it is in Grid Parallel mode, or by a voltage synchronization circuit (shown later herein), as it is in a synchronization or stand alone modes. When switch 51 is switched to the $V_{REF}$ signal generated by controller 48, inverter 10 operates according to output current/power regulation control, and when switch 51 is switched to the $V_{REF}$ signal generated during synchronization and stand alone modes, inverter 10 operates according to output voltage regulation control.

Figure 2B:
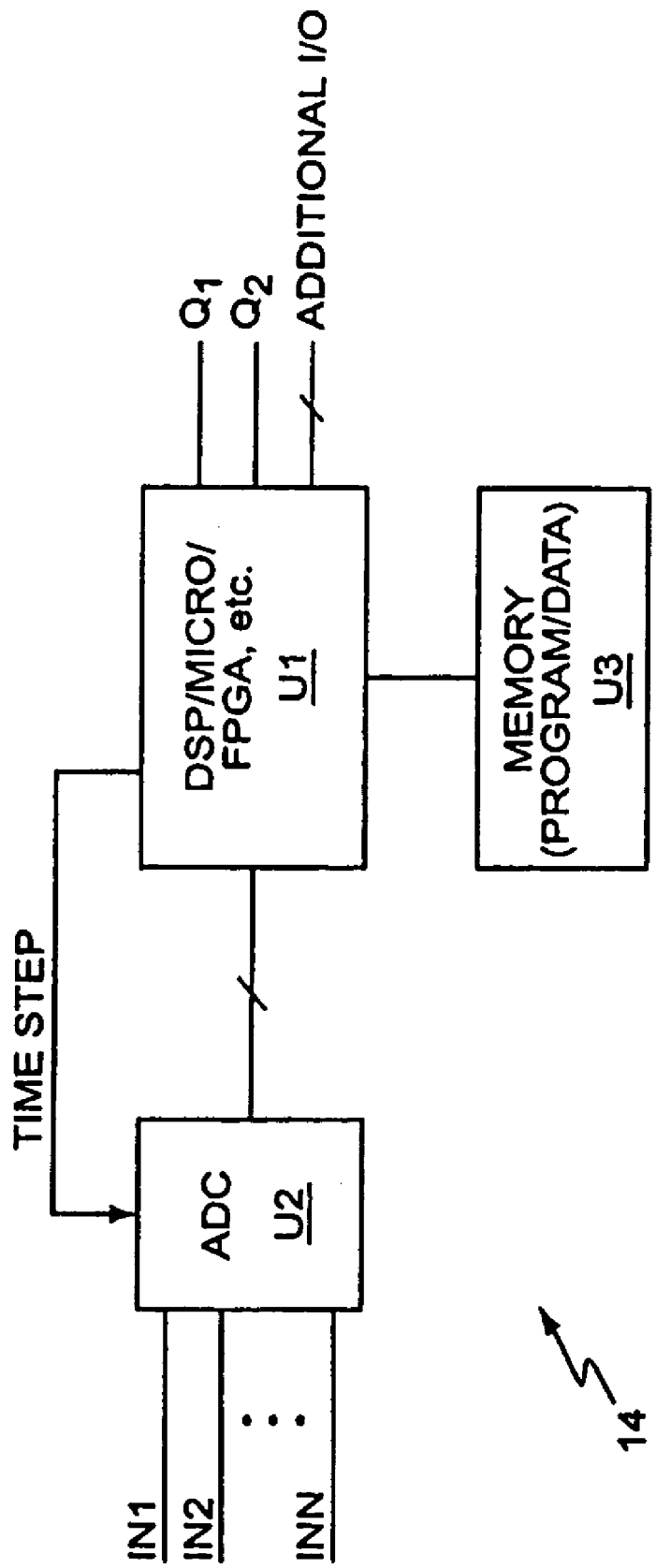

FIG. 2B illustrates an exemplary digital signal processing embodiment for control circuit 14, including one or more integrated circuits, a processor U1, analog-to-digital converter(s) U2, and program/data memory device(s) U3. Thus, regulator circuit 16 can be embodied in whole or in part as a computer program (software, firmware, or microcode, etc.) executing on a digital signal processor (DSP) such as a TMS320C24x series DSP from Texas Instruments.

Of course, it should be understood that a processor-based implementation of regulator 16 is not limiting and its functionality can be embodied in software, hardware, or any combination thereof. The ADCs can be used to move input signals between the analog and digital domains as needed or desired. Discrete (switch) outputs from processor U1 can be used to control the inverter circuit 12 as desired.

Regardless of the particular implementation details, the exemplary phasor calculator 34 generates x-y phasors for feedback signals corresponding to the inverter's output voltage and current waveforms and, in grid-connected operation, for the grid voltage. Reference signals $REF_X$ and $REF_Y$, which can be digital sinusoidal waveforms that can be generated by a phase locked loop (PLL) locked to the mains voltage, establish the x-y coordinate frame used by phasor calculator 34. $REF_X$ establishes the in-phase (x) coordinate frame axis and $REF_Y$ establishes the quadrature (y) coordinate frame axis. In an exemplary embodiment, $REF_X$ and $REF_Y$ are referenced to the grid voltage, which is deemed to have zero phase, i.e., the grid voltage establishes the in-phase (x) reference point for the x-y coordinate frame. In Stand Alone mode, the x-y reference frame is based on internal timing established by frequency/phase locking circuits included in control circuit 14.

Phasor calculator 34 can be particularly adapted for the calculation of phasor components in single-phase inverter configurations. A sinusoidal voltage waveform can be represented by the equation, $$v(t)=V\cos(\omega t+\phi)=Re\{Ve^{j\omega t}\}. \tag{1}$$

One can represent the phasor amplitude V as a complex number expressed as a magnitude and phase, or as real and imaginary parts, as follows, $$V=V_x+jV_y \text{ or } V=|V|e^{j\phi}=V_x+jV_y, \tag{2}$$

where x and y phasor values for V can be determined as, $$V_x=|V|\cos(\phi), \text{ and} \tag{3}$$

$$V_y=|V|\sin(\phi). \tag{4}$$

In single-phase applications, phasor-calculator 34 averages over half-cycles of the fundamental waveform period to obtain correctly computed x-y phasor components for voltage and current waveforms. An exemplary phasor-calculator 34 can be configured to perform such integration by averaging over an integer number of half-cycles.

FIG. 5 illustrates an exemplary configuration for phasor calculator 34 that includes a calculation circuit 100 for each input signal being processed by phasor calculator 34. Circuit 100 comprises a pair of multipliers 102 that separately multiply the input signal ($V_{OUT}$, $V_{GRID}$, or $I_{OUT}$, etc.) by the in-phase and quadrature reference signals, $REF_X$ and $REF_Y$. Each multiplier's output feeds into one of the integrators 104, which performs the half-cycle averaging. Thus, phasor calculator 34 generates in-phase and quadrature fundamental components—Fourier components—for the inverter's output voltage and current, and for the grid voltage. Power calculator 36 (FIG. 6) receives the $V_{XOUT}$, $V_{YOUT}$, $I_{XOUT}$, and $I_{YOUT}$ fundamental components for inverter voltage and current, and from them computes the fundamental real and reactive power being output by inverter 10 based on summing selected product terms. With the x-y phasor components for voltage and current, the inverter's real power can be determined by, $$P=\frac{1}{2}Re\{V_A I_A^*\}=\frac{1}{2}(V_{XA}I_{XA}+V_{YA}I_{YA}), \tag{5}$$

where * represents the complex conjugate, and reactive power can be determined as, $$Q=\frac{1}{2}Im\{V_A I_A^*\}=\frac{1}{2}(V_{YA}I_{XA}-V_{XA}I_{YA}). \tag{6}$$

FIG. 6 illustrates an exemplary embodiment for power calculator 36 to implement Eqs. (5) and (6) that includes four input multipliers 106 that are paired together with respect to summing circuits 108 and 112, respectively. Summing circuit 108 outputs a signal based on adding $V_{XOUT}I_{XOUT}$ to $V_{YOUT}I_{YOUT}$, which sum is then scaled by one-half in a first gain circuit 110 to produce the real power measurement value P (Watts). Summing circuit 112 outputs a signal based on subtracting $V_{XOUT}I_{YOUT}$ from $V_{YOUT}I_{XOUT}$, which result is then scaled by one-half in a second gain circuit 110 to produce the reactive power measurement Q (Vars).

Power controller 42 (FIG. 3) receives commanded values of real and reactive power, P* and Q*, measured values of real and reactive power, P and Q, and a power command ramp signal [RAMP]. The controller outputs are command values of x-axis and y-axis phasor currents.

The controller 42 uses the command values P* and Q* themselves as feedforward command signals. In addition, the controller 42 computes the error between the desired and measured real power, and the desired and measured reactive power. These error signals are input to P/I regulators 54, which null out steady state errors in the power control loop. The P/I outputs are summed with the feedforward command values at summing junctions 56. The resulting signals, which have units of power, are divided by the magnitude of the terminal voltage to yield the command values of x-axis ($I_{XOUTREF}$) and y-axis ($I_{YOUTREF}$) phasor currents.

The RAMP signal is a Boolean variable that is asserted when the command values P* and Q* are changing. When the values of P* and Q* are constant, the RAMP signal is low and the error signals are input to the P/I regulators 54. The P/I regulators 54 act to reduce the steady state errors to zero. Asserting the RAMP signal during changing values of P* and Q* causes the switch 52 to toggle, placing a zero at the input to the P/I regulators 54. This action effectively disables the P/I regulators 54 during changes in the command values and prevents integrator windup.

Figure 3:
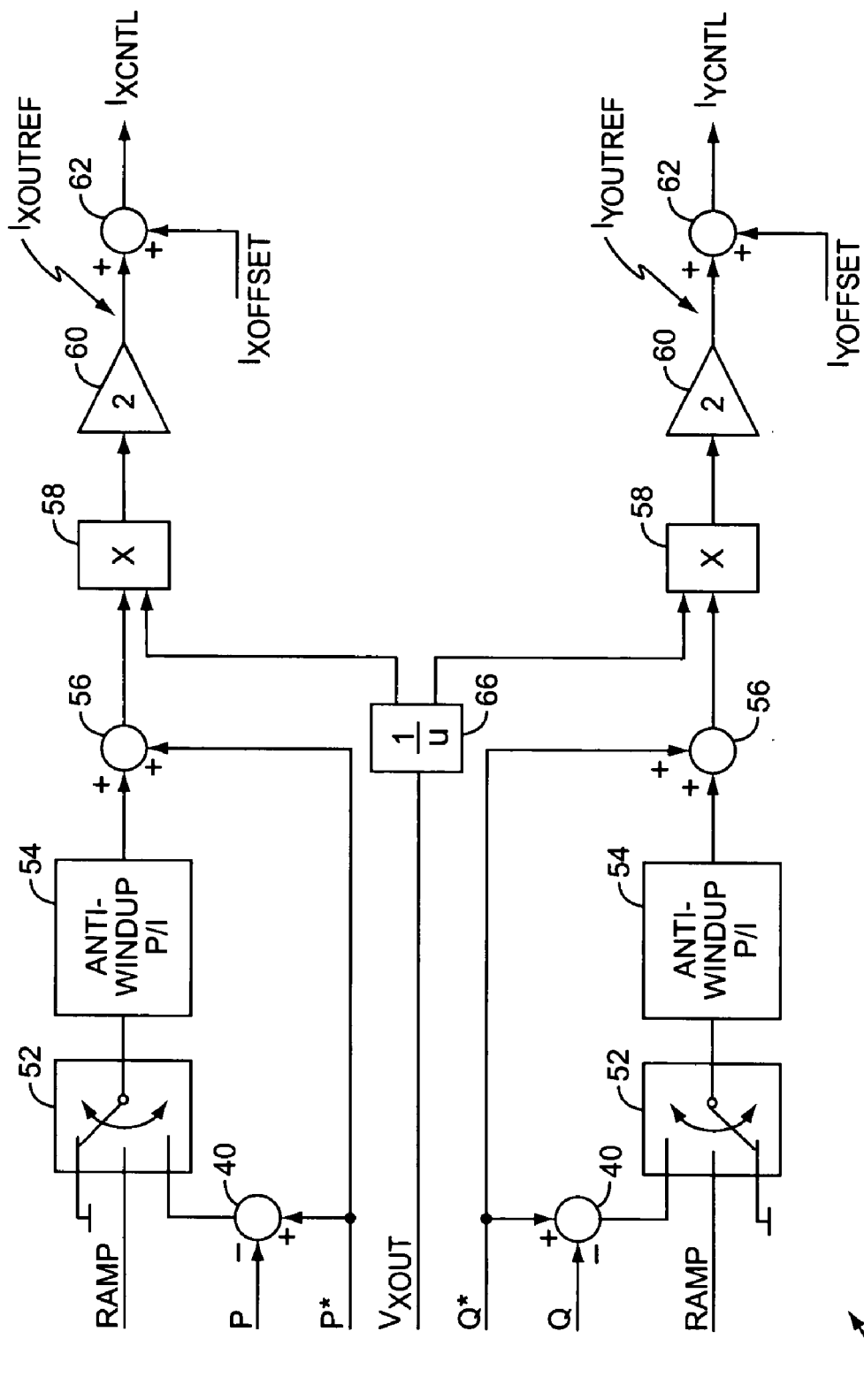
FIG. 3 is a diagram of an exemplary phasor-based power controller.

FIG. 3 illustrates an exemplary embodiment of power controller 42, which comprises substantially identical first and second power control signal paths including first and second switches 52, first and second anti-windup Proportional-integral (P/I) regulators 54, first and second summing circuits 56, first and second multipliers 58, and first and second gain circuits 60. Both signal paths further include summing circuit 62, and both paths share a 1/u multiplier 66 that provides the inverse value of $V_{XOUT}$ to the first and second multipliers 58.

In looking at the real power control signal path, the first switch 52, controlled by the ramp signal RAMP, provides the first P/I regulator 54 with either a zero (default) signal, or the real power error signal (P–P*). The first P/I regulator 54 provides its output signal to the first summing circuit 56, which sums the P/I signal with the desired real power signal P*. That sum feeds into the first multiplier 58, where it is multiplied by $1/V_{XOUT}$. The product is scaled by the first gain circuit 60 to generate a dc domain current $I_{XOUTREF}$ that is summed in a first summing circuit 62 with a signal termed $I_{XOFFSET}$ to form a control signal, $I_{XCNTL}$. The signal $I_{XCNTL}$ corresponds to the in-phase inverter output current needed to reduce the difference between the measured and desired real power.

The $I_{XOFFSET}$ signal can be generated by multiplying $V_{XOUT}$ by known admittance values representing, e.g., capacitor and fan loads. Thus, $I_{XOFFSET}$ can be generated as compensation for no-load currents of inverter 10 according to $I_{XOFFSET}=Y_X V_{XOUT}$, where $Y_X$ represents an admittance value. Alternatively, $I_{XOFFSET}$ can be set to a fixed value based on expected voltage and admittance values.

Similar processing is used for the reactive power, and results in generation of the $I_{YCNTL}$ current control signal corresponding to the quadrature inverter output current needed to reduce the difference between the measured and desired reactive power. As with the x-component, $I_{YCNTL}$ can be compensated or otherwise adjusted using an $I_{YOFFSET}$ signal calculated like the $I_{XOFFSET}$ signal but using y-components.

The substantially dc in-phase and quadrature current control signals, $I_{XCNTL}$ and $I_{YCNTL}$, feed into waveform generator 44, which use time-step advanced versions of the $REF_X$ and $REF_Y$ signals to convert them into a combined ac waveform, $I_{REF}$, representing the desired instantaneous value of inverter output current, $I_{OUT}$, desired for inverter 10.

FIG. 7 illustrates an exemplary embodiment of waveform generator 44, which comprises first and second input multipliers 114, and an output summing circuit 116 to provide $I_{REF}$. The first multiplier 114 multiplies $I_{XCNTL}$ by the $REF_X$ waveform and the second multiplier performs the same operation on $I_{YCNTL}$ but uses the $REF_Y$ waveform. Generator 44 thus generates in-phase and quadrature (sinusoidal) waveforms corresponding to desired in-phase and quadrature components of the inverter's output current $I_{OUT}$ and sums them to provide $I_{REF}$.

Figure 4A:
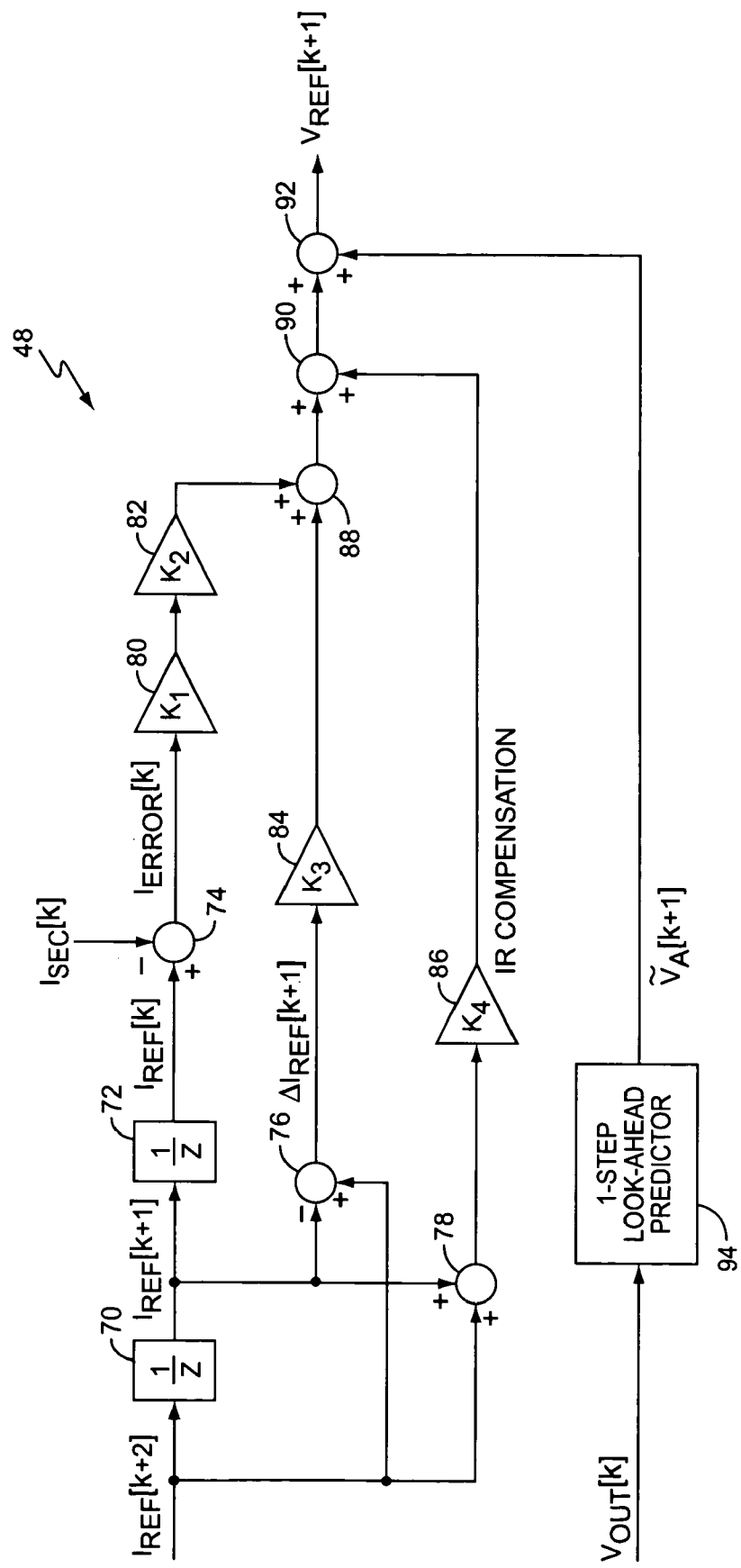
FIG. 4A is a diagram of an exemplary current controller.

Current controller 48 receives $I_{REF}[k+2]$ as a control input, and receives $I_{SEC}[K]$ and $V_{OUT}$ as feedback signals. FIG. 4A illustrates an exemplary current controller 48, which comprises delay circuits 70 and 72, summing circuits 74, 76, and 78, gain circuits 80, 82, 84, and 86, summing circuits 88, 90, and 92, and look-ahead circuit 94.

Together, these circuits provide an inverter control signal $V_{REF}$, which controls the output from inverter circuit 12. The control input signal $I_{REF}[k+2]$ is already advanced by 2 time steps at the point where it is generated by waveform generator 44. The delay circuits 70 and 72 for $I_{REF}$ generate two additional versions of the control signal $I_{REF}[k+1]$ and $I_{REF}[k]$, advanced by 1 time step and zero time steps, respectively. Summing circuit 76 generates a difference signal $\Delta I_{REF}[k+1]$, representing the anticipated change in the $I_{REF}$ control input over the next time interval. Gain circuit 84 converts the anticipated current change into a voltage to be applied across the inverter's equivalent series inductance $L_{eq}$, in order to drive the anticipated current change.

In addition to the anticipated change in the $I_{REF}$ control input, there will generally be some error $I_{ERROR}[k]$ between the desired current value $I_{REF}[k]$ and the actual (measured) current value $I_{SEC}[k]$. Summing circuit 74 measures the current error $I_{ERROR}[k]$, and gain circuits 80 and 82 convert the current error into a voltage correction to be applied to the series inductance $L_{eq}$ to correct for the error. Summing circuit 78 and gain circuit 86 serve to calculate an additional correction for voltage drops due to the inverter's equivalent series resistance. Summing circuits 88 and 90 serve to add the two correction signals to the original voltage calculation from gain circuit 84, to yield a total voltage to be applied across $L_{eq}$.

Look-ahead circuit 94 generates a prediction of the inverter output voltage $V_{OUT}$ at the next time step, using a linear predictor that is optimized for sinusoidal voltage signals. Summing circuit 92 then adds the predicted output voltage to the required voltage across $L_{eq}$, to yield a voltage command $V_{REF}[k+1]$ to be applied to the inverter during the next time step.

Figure 4B:
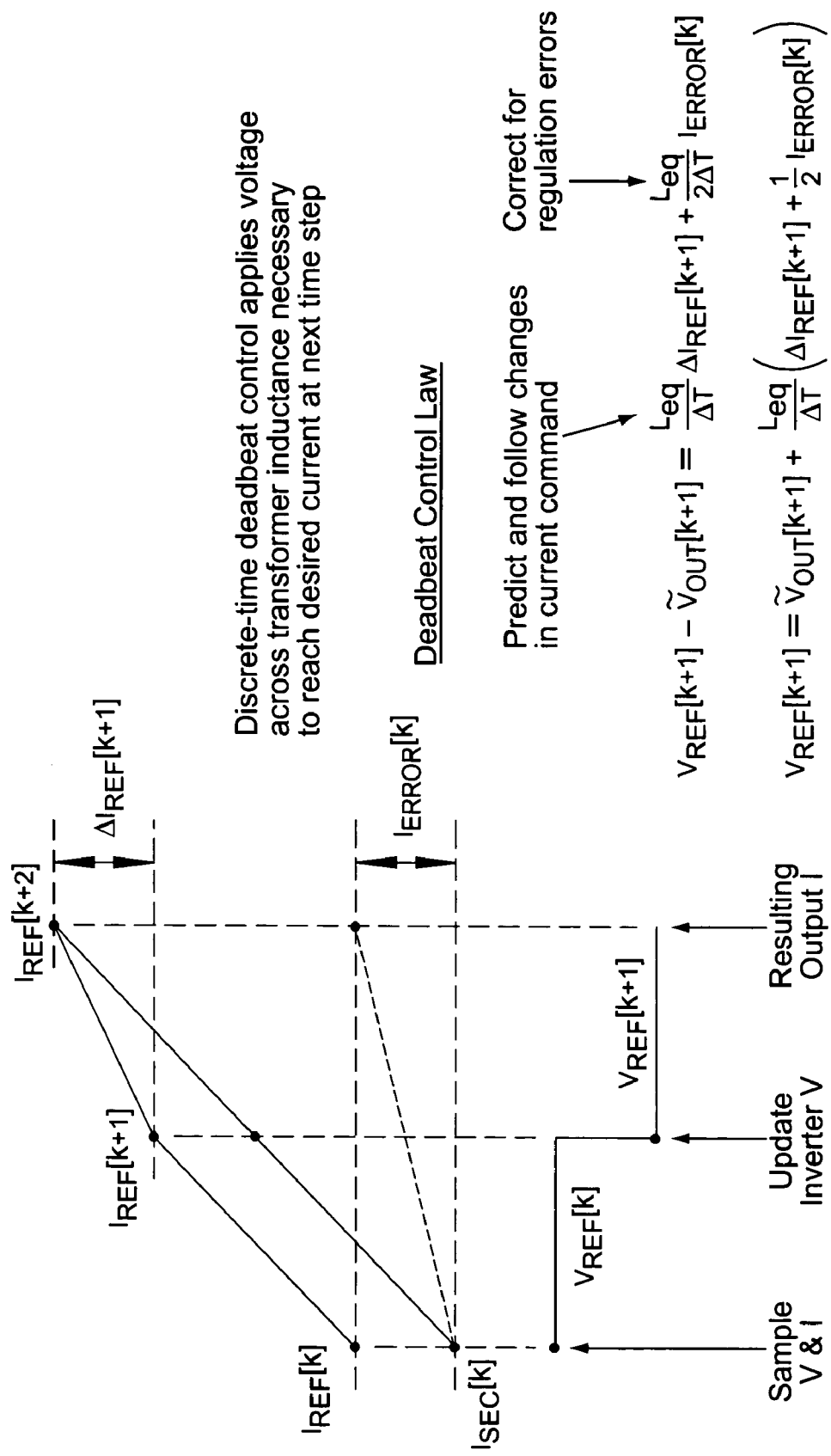
FIG. 4B is a diagram of exemplary control details for the controller of FIG. 4A.

Thus, as detailed above, and as graphically depicted in FIG. 4B, exemplary control law delays provided by current controller 48 account for the difference between measuring the inverter's output and commanding a change in that output, i.e., the control loop delay between commanding a change in inverter voltage and measuring the current corresponding to that change. In the illustrated embodiment, the current and voltage measurements performed at sample time k are used to calculate the inverter voltage to be applied at time k+1, which in turn will result in changes in the inverter's output current at time k+2, thus accounting for the two $z^{-1}$ delays in the control path.

Finally, switching controller 50 generates inverter switching control signals responsive to the $V_{REF}$ signal output by current controller 48. For the switching network shown in FIG. 1C, an exemplary switching controller can be configured as a PWM signal generator that outputs complementary pulse trains for switching transistor circuits Q1 and Q2 on and off according to pulse width timing determined from $V_{REF}$.

Thus, the inverter's output is matched to the required (or desired) magnitude, frequency, and phase not by directly setting current and voltage phases and magnitudes but rather by referencing the inverter's x-y coordinate frame to a desired anchor point, e.g., the grid voltage, and controlling the real and reactive powers measured for the inverter in relation to desired real and reactive powers. That method has the added advantage of transforming most control variables into substantially dc values and enables relatively straightforward phasor-based control law calculations.

Reliable islanding detection is among the many advantages accruing from the ability to accurately control real and reactive power. With grid-connected operation, the possibility exists that a portion of the grid 24 connected to the inverter 10 will become isolated from the rest of grid 24, e.g., the "service hookup" and associated local feeder lines that provide power from the grid 24 to load 20. Under such conditions, inverter 10 can keep the islanded portion of grid 24 energized, creating a potentially hazardous condition for service personnel and anyone else that is unaware of the island's energized condition.

If the load's local feeder lines are connected to the grid 24 and grid 24 is operating within nominal conditions, changes in the inverter's output affect power quality and net power flow between the inverter 10 and the grid 24, but those changes do not disturb the grid's line frequency and voltage. From the inverter's perspective, grid 24 looks like a very stiff voltage source that essentially cannot be disturbed by variations in the inverter's output. However, that is not true when the load's local feeder lines become disconnected from the grid 24.

In particular, when the load's local feeder lines are connected to the grid 24, changes in the reactive power output by the inverter 10 change the power factor associated with inverter 10 but do not change the line frequency. If the feeder lines become isolated, such that they and the load are driven only by the inverter 10, changing the inverter's reactive power output shifts the inverter's output frequency. With independent real and reactive power control, inverter 10 thus can be configured to detect islanding by changing its reactive power output and monitoring for any resulting change in frequency.

When operating in Stand Alone mode, control circuit 14 changes the reference for the x-y coordinate frame from the grid voltage to an internally generated reference framework. Thus, the x and y axes of the coordinate frame can be selectively established by an internal in-phase and quadrature reference circuit, or by the grid's frequency and phase. The ability to set the reference for the x-y coordinate frame on either internal or external references enables the x-y based control scheme to operate in either Grid Parallel or Stand Alone modes, and to smoothly change between modes.

Figure 8:
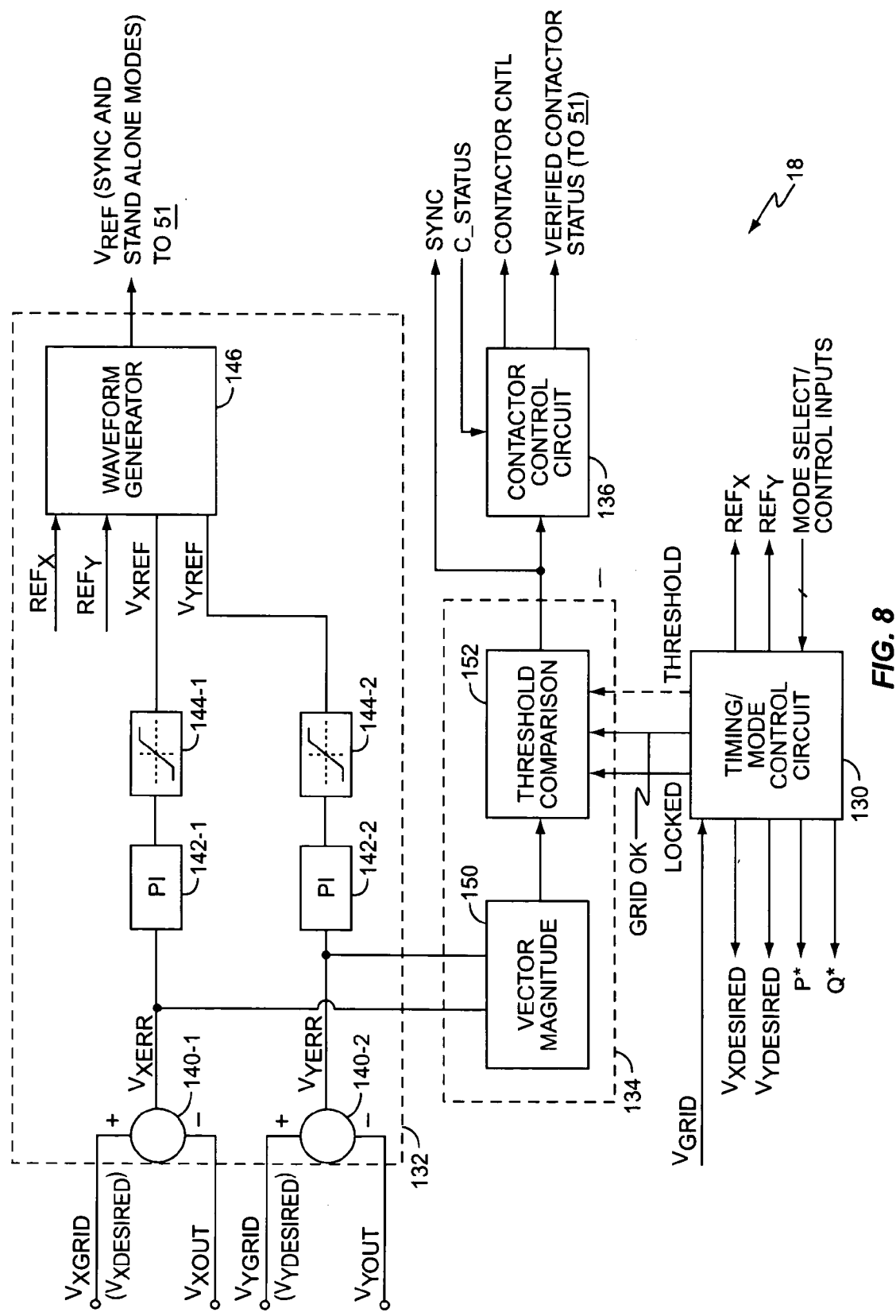
FIG. 8 is a diagram of an exemplary control circuit including synchronization, contactor, timing, and mode control circuits.

In particular, with respect to changing from Stand Alone mode to Grid Parallel mode, the control must match the inverter's output voltage to the ac mains voltage of grid 24. That is, inverter 10 must synchronize to grid 24 before connecting to it by matching the amplitude and phase of $V_{OUT}$ to that of $V_{GRID}$. FIG. 8 illustrates exemplary elements of the one or more additional processing and system control circuits 18 that provide mode control, mains frequency/phase locking, synchronization and contactor control. It should be understood that the illustrated circuits can be implemented in whole or in part in a DSP or other digital processing logic and can be integrated with the signal processing logic of regulator circuit 16.

The one or more additional processing and system control circuits include, but are not necessarily limited to, a timing/mode control circuit 130, a voltage control circuit 132, a sync detection circuit 134, and a contactor control circuit 136. In operation, the timing/mode control circuit 130 provides mode control (e.g., Stand Alone mode, Synchronization mode, Grid Parallel mode, Stop mode, and Idle mode) based on default mode selection, user inputs, and/or based on monitoring relevant signals, such as whether the grid is present and operating within nominal parameters, etc.

Timing/mode control circuit 130 further provides the $REF_X$ and $REF_Y$ signals discussed earlier herein. When operating in Stand Alone mode, the $REF_X$ and $REF_Y$ signals are digital sinusoids referenced to desired stand-alone voltage magnitude, phase, and frequency. When operating in Synchronization or Grid Parallel modes, the $REF_X$ and $REF_Y$ signals are referenced to the ac mains voltage of grid 24.

In operation, voltage control circuit 132 generates the $V_{REF}$ signal that is used to control PWM switching controller 50 (see FIG. 2A) during Synchronization and Stand Alone modes of operation. In the Stand Alone mode of operation, timing/mode control circuit 130 uses stored values or other defined constants to represent the desired x and y components of the inverter's output voltage, denoted as $V_{XDESIRED}$ and $V_{YDESIRED}$, respectively. Differencing circuits 140-1 and 140-2 thus generate fundamental component error signals $V_{XERR}$ and $V_{YERR}$ based on the difference (error) between the desired fundamental components of inverter output voltage and the measured x and y fundamental components of its actual output voltage (denoted as $V_{XOUT}$ and $V_{YOUT}$).

During Synchronization mode, voltage control circuit 132 controls its output $V_{REF}$ based on the error between the inverter's measured output voltage ($V_{XYOUT}$), and the grid's measured voltage ($V_{XYGRID}$). That is, $V_{XGRID}$ is substituted for $V_{XDESIRED}$ and $V_{YGRID}$ is substituted for $V_{YDESIRED}$. Thus, when inverter 10 is to be connected to grid 24, it synchronizes its output voltage to the grid based on matching the fundamental components of its output voltage to the corresponding fundamental (x-y) components of the grid voltage. This approach effectively ignores harmonic differences in grid and inverter voltages that might otherwise disturb control stability or cause matching errors.

As an overview of operation, the difference between $V_{XGRID}$ and $V_{XOUT}$ and between $V_{YGRID}$ and $V_{YOUT}$ represent the fundamental error voltage components. During Synchronization mode operation, voltage control circuit 132 adjusts its $V_{REF}$ output to control switching controller 50 (via switch 51 in FIG. 2A) such that $V_{OUT}$ changes to reduce the error. Once inverter 10 is synchronized and contactor closure is verified, switch 51 can be switched over such that switching controller 50 is driven by regulator circuit 16 in its current/power regulation operation rather than by the output voltage regulation provided by voltage control circuit 132. Of course, it should be understood that this control switching scheme can be implemented in software such that control switchover simply means executing different portions of the inverter control program.

Figure 9:
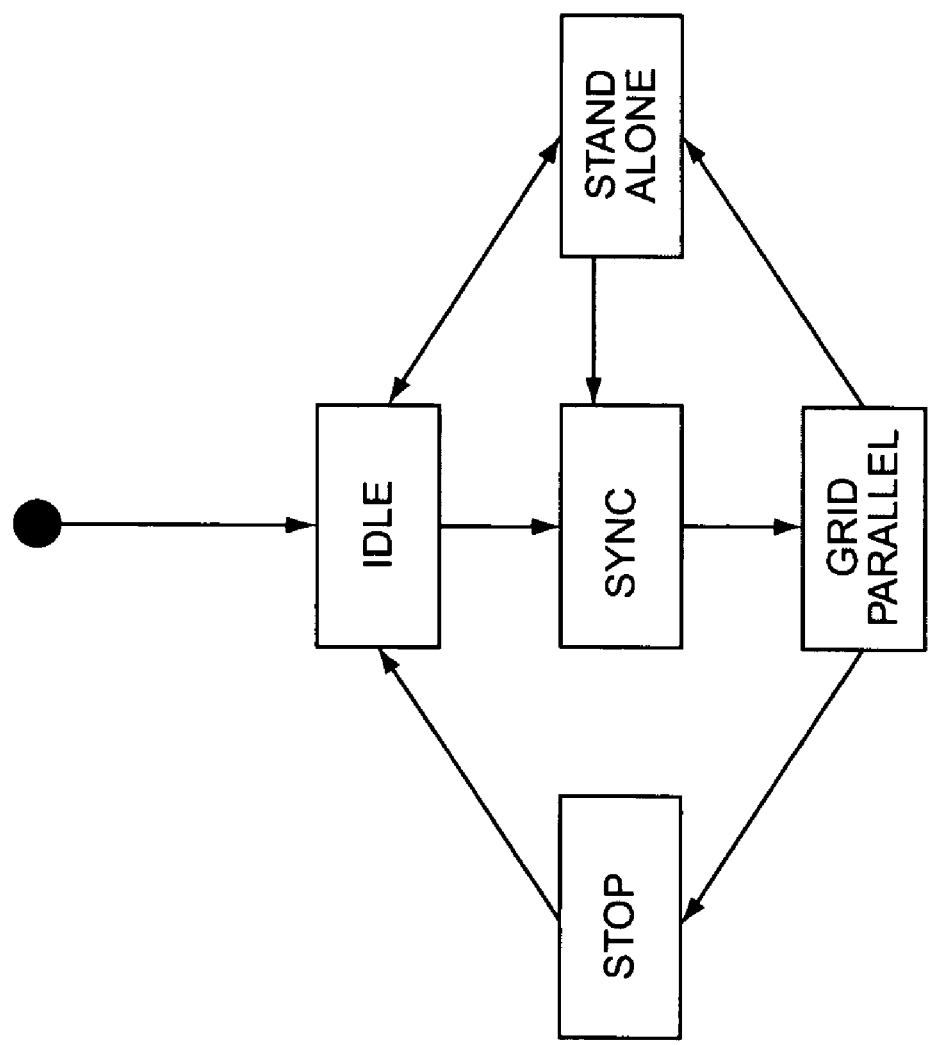
FIG. 9 is a diagram of exemplary state/mode logic.

In general, the inverter 10 operates according to exemplary mode control and FIG. 9 illustrates the state transitions associated with the aforementioned exemplary modes—Stand Alone, Grid Parallel, Stop, Idle, and Sync.

As a mode transition overview, inverter 10 can, after starting operations, transition from Idle mode to Stand Alone mode where it regulates its output voltage according to desired x and y output voltage components. From Stand Alone mode, inverter 10 can transition through Synchronization mode, wherein it matches its output to measured fundamental components of the grid voltage, to Grid Parallel mode. Alternatively, inverter 10 can return from Stand Alone mode directly to Idle mode, for example in response to a user command. Instead of starting up in Stand Alone mode, inverter 10 can, after starting operation, transition from Idle mode through Synchronization mode to Grid Parallel mode. In Grid Parallel mode, inverter 10 regulates its current/power output in accordance with desired output values of real and reactive power. From Grid Parallel mode, inverter 10 can return to Stand Alone mode responsive to a user mode control command, for example, or responsive to detecting problems in the grid. Alternatively, inverter 10 can transition from Grid Parallel mode to Stop mode, wherein it shuts down its output.

Figure 10:
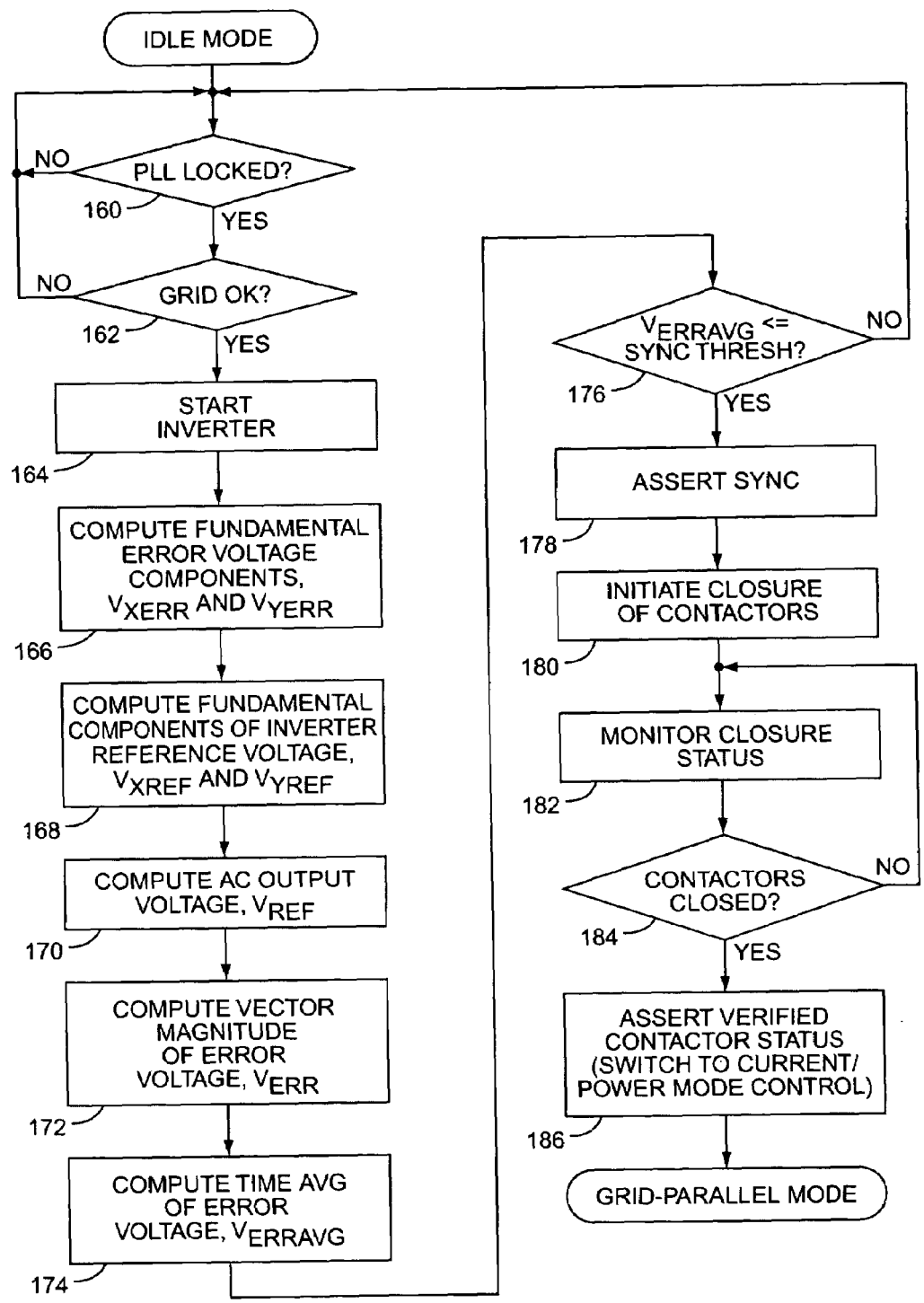
FIG. 10 is a diagram of exemplary synchronization processing logic.

FIG. 10 illustrates exemplary mode control logic that can be used to transition the inverter 10 from the Idle mode through the Synchronization mode and into the Grid Parallel mode. Timing/mode control circuit 130 or other processing element within inverter 10 can be configured to execute the illustrated mode control, and in an exemplary embodiment, the illustrated processing logic is implemented at least partly based on executing stored computer program instructions in a microprocessor or other logical processing circuit.

Assuming that it is desired to move the inverter 10 from the Idle mode to the Grid Parallel mode, exemplary processing logic first checks whether the inverter's PLL is locked to the ac mains voltage (Step 160). If not, the inverter 10 waits subject to time-out or override control for the PLL to achieve lock. Once the inverter is locked to the grid's phase and frequency, processing logic next checks to see that the grid 24 is within an allowable operating range, i.e., that its voltage and frequency are correct (Step 162). The presence or absence of the LOCKED and GRID OK signals can be used to control whether the sync detection circuit 134 operates, i.e., whether it attempts to determine if synchronization has been achieved. That, in turn, can be used to control whether contactor circuit 136 attempts to close contactors 26. Thus, the LOCKED/NOT LOCKED and GRID OK statuses can be used as the trigger for attempting synchronization and contactor closure.

Assuming that lock is achieved (LOCKED is true) and that the grid 24 is operating within normal limits (GRID OK is true), the processing logic "starts" the inverter (Step 164), wherein it begins the synchronization steps required to move into the Grid Parallel mode of operation. Synchronization mode processing begins with the computation of fundamental error voltage components, $V_{XERR}$ and $V_{YERR}$ (Step 166), which are computed based on the difference between the inverter's x-y output voltage components and the grid's x-y voltage components. Voltage control circuit 132 includes two summing circuits 140-1 and 140-2 that are used to generate $V_{XERR}$ as $(V_{XGRID}-V_{XOUT})$ and to generate $V_{YERR}$ as $(V_{YGRID}-V_{YOUT})$. Processing continues with computation of the fundamental components of inverter reference voltage, $V_{XREF}$ and $V_{YREF}$ that are used to control the inverter's output voltage during Synchronization mode operations (Step 168).

$V_{XREF}$ and $V_{YREF}$ are generated using P/I circuits 142-1 and 142-2, respectively, in combination with the corresponding limiter circuits 144-1 and 144-2. Thus generated, $V_{XREF}$ and $V_{YREF}$ serve as inputs to a waveform generator 146 that is like the earlier described waveform generator 44. Indeed, in a digital processing implementation, the same program functions can be reused since waveform generator 44 runs during grid mode and waveform generator 146 runs during Stand Alone and Synchronization modes. With this configuration, $V_{XREF}$ serves as the coefficient for generating the cosine (x) component of the $V_{REF}$ waveform from the $REF_X$ sinusoid and $V_{YREF}$ serves as the coefficient for generating the sine (y) component of the $V_{REF}$ waveform from the $REF_Y$ sinusoid. Waveform generator 146 thus provides the ac output voltage $V_{REF}$ for Stand Alone and Synchronization mode operations (Step 170).

Processing continues with the computation of the vector magnitude of voltage error, $V_{ERR}$, by the vector magnitude calculator circuit 150 of sync detection circuit 134 (Step 172), which can be configured to calculate $V_{ERR}$ as, $$|V_{ERR}| \approx |\Delta V_{XERR}| + |\Delta V_{YERR}|. \tag{7}$$

Equation (7) thus can be used to approximate the phasor magnitude error. Of course, a computation can be performed to calculate the true phasor magnitude error based on the square root of the sum of the x-y phasor errors squared, and other calculations can be used to arrive at alternative synchronization metrics as needed or desired.

The threshold comparison circuit 152 can be configured to calculate a time average of $V_{ERR}$, $V_{ERRAVG}$, to provide smoothing of the error value (Step 174). For example, it can take the moving average of the last n samples of $V_{ERR}$ to generate $V_{ERRAVG}$. Regardless, the threshold comparison circuit 152 compares the time averaged error value to a threshold value that reflects, for example, the voltage error below which inverter 10 is considered synchronized (Step 176). The threshold value can be set to an empirically determined default value, or it can be configurable, or otherwise adjustable. In any case, the detection threshold is set low enough to avoid premature interconnection of the inverter 10 but high enough to account for measurement and control tolerances.

If the inverter 10 is not synchronized, processing continues with a repetition of the voltage adjustment and error measurement loop just described and a repeat evaluation of $V_{ERRAVG}$. The same control loop executes repeatedly until synchronization is achieved, or another control mechanism (time-out, override, etc.) ends the synchronization process. Once synchronization is achieved, the threshold comparison circuit 152 asserts its synchronization indicator, e.g., it asserts a "SYNC" signal that can be used to trigger operation of the contactor control circuit 136 (Step 178).

Responsive to the assertion of the sync indicator, the contactor control circuit 136 initiates closure of the contactors 26 that electrically connect and disconnect inverter 10 from grid 24 (Step 180). It can assert a contactor control signal to effect such initiation and it should be understood that the control signal can be buffered, amplified, etc., as needed to provide the appropriate closure signal to contactors 26.

Contactor control circuit 136 then monitors one or more feedback signals to verify that the contactors 26 actually closed (Step 182), and continues monitoring until contactor closure is "verified" (Step 184). Note that the monitoring loop can be configured to include a time-out override to break the control program out of closure verification loop if it runs too long.

In verifying contactor closure, contactor control circuit 136 can monitor C_STATUS, for example. C_STATUS can be a contactor position signal that indicates the open/closed state of the mechanical contactors within contactors 26, or it can be a measurement signal. Thus, C_STATUS, or another feedback signal, can be configured as a measurement signal proportional to the harmonic current flow between the inverter 10 and the grid 24. (The flow of such harmonic current is a definitive indication of electrical interconnection, i.e., a definitive indication of closed contactors 26.) Contactor control circuit 136 can be configured to implement an n-point averaging filter such that it uses an averaged value of harmonic current. The averaged harmonic current value can be compared to a threshold value that is set or is configurable.

Alternatively, contactor control circuit 136 can be configured to verify contactor closure inferentially by initiating contactor closure and then waiting for a period of time corresponding to an expected actuation delay of contactors 26, e.g., 30 milliseconds. After expiration of the delay period, contactor control circuit 136 can assume that the contactors 26 are closed. Additionally, contactor closure can be verified by monitoring an auxiliary contactor signal that changes state responsive to contactor closure, by monitoring a contactor current induced by armature movement, or essentially by any other status monitoring means that directly or inferentially indicates contactor status.

In any case, once contactor closure is verified, the control mode is switched from the voltage-mode control of voltage control circuit 132 to the current-mode regulation control of regulator circuit 16. That is, once the inverter 10 is connected to the grid, the control of its output is switched over to the current-mode real and reactive power regulation described earlier herein. To accomplish this control switchover, control circuit 136 can assert a "verified closure" signal to indicate the closed status of contactors 26 (Step 186). That signal can be used, for example, to actuate switch 51 and thereby change over control of the inverter's output from voltage control circuit 132 to regulator circuit 16.

Figure 11:
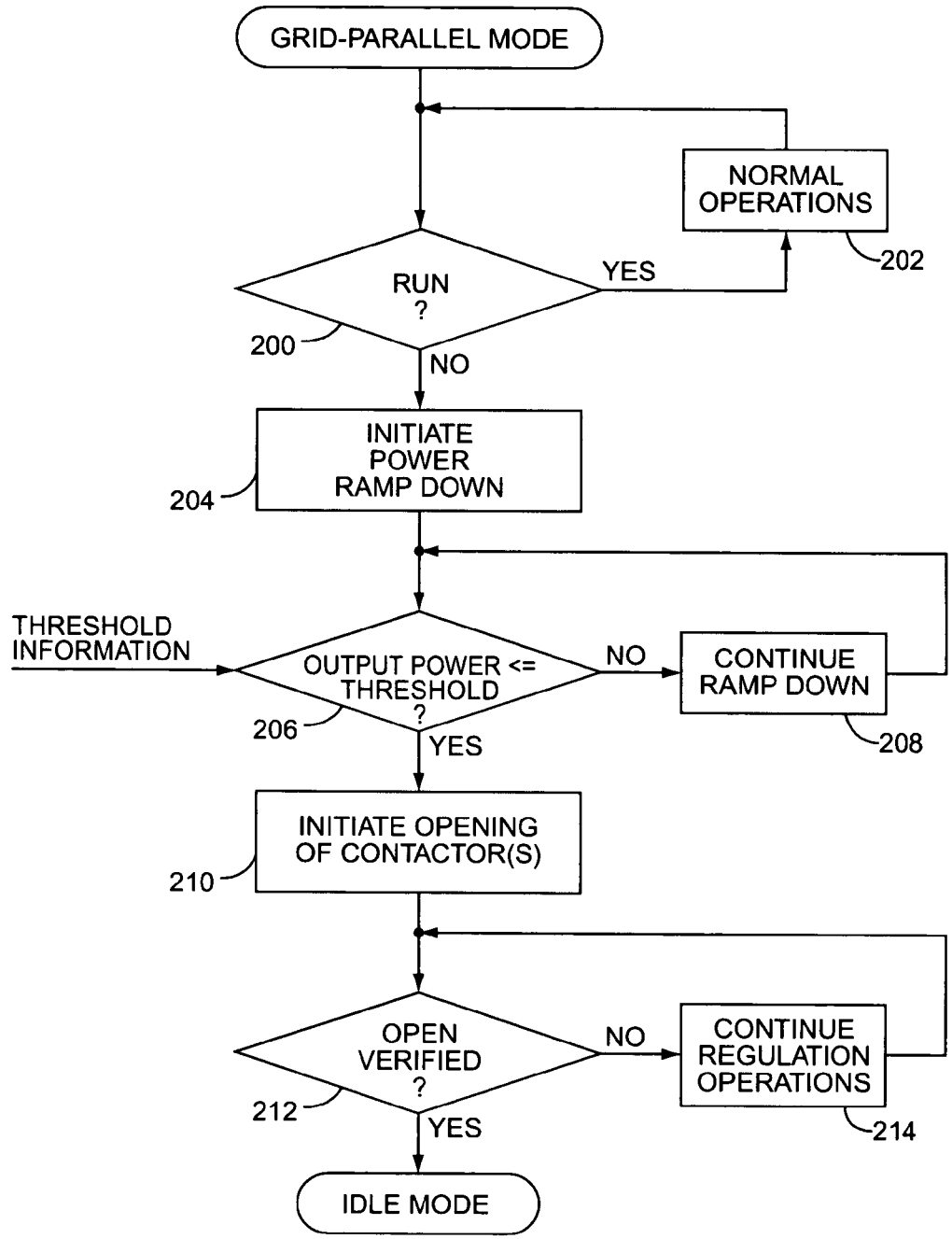
FIG. 11 is a diagram of exemplary disconnection processing logic.

At some point, it will be desired (or required) to move inverter 10 from Grid Parallel mode back to the Idle mode, and FIG. 11 illustrates exemplary logic for carrying out that mode transition. Processing begins with the assumption that inverter 10 is operating in Grid Parallel mode and that its output is under current/power regulation by regulator circuit 16. The inverter 10 can be held in this state by maintaining the logical assertion of a "run" command. The timing/mode control circuit 130, or another control element within control circuit 14, can be configured to effect disconnection control or to maintain run operations based on checking the state of the run command (Step 200). If the run state is desired, normal run state operations continue (Step 202), i.e., inverter 10 continues Grid Parallel operations under regulation control by regulator circuit 16.

If the run state is not desired, disconnection ramp down is initiated (Step 204). To effect ramp down, the timing/mode control circuit 130, or other control element, begins adjusting the P* and Q* real and reactive power commands such that the power regulation target for regulator circuit 16 begins falling. As such, regulator circuit 16 begins regulating the output power downward as a function of the decreasing P* and Q* commands. The earlier described power measurement functions—see FIG. 2A—are used to monitor the falling output power of inverter 10, and to make a comparison of the inverter's output power to a low power threshold, which can be set to zero or to some desired minimal output power level (Step 206). If the output power is above the threshold, the ramp down continues (Step 208). Note that with the earlier described power measurement scheme, the measured output power reaches its minimum value approximately one half cycle after the commanded power reaches the threshold value, e.g., zero.

When the measured output power falls below the threshold, contactor control circuit 136 is commanded to open contactors 26 (Step 210). Contactor control circuit 136 initiates contactor opening by asserting its contactor control signal(s) to effect opening of contactors 26 and then begins an open-verification monitoring loop similar to that used for verifying contactor closure (Step 212). Before contactor opening is verified, regulator circuit 16 continues its regulation of the inverter's output power (Step 214). Verification of the open condition can be based on monitoring current flow, inferred from expiration of a contactor actuation timer as explained before, based on detecting contactor armature movement, or essentially any other means of direct or inferential contactor status sensing. Note that if current flow verification is used, averaging and thresholding operations similar to those used for closure verification can be used.

Once opening is verified, contactor control circuit 136 changes the state of its verified contactor status signal to indicate that the contactors 26 are open, or otherwise provides a logical indication of the verified open status. In response to the open status verification, inverter control reverts to the Idle mode of operation wherein the inverter's output is shut down or otherwise disabled.

Thus, control circuit 14 implements an exemplary disconnection control scheme to control the transition of inverter 10 from Grid Parallel mode to Idle mode wherein the regulator circuit 16 is controlled such that it ramps down the real and reactive output powers of inverter 10 to a low power threshold (e.g., zero) in a controlled fashion and then opens contactors 26. With this method, the inverter power and current are brought to zero in a controlled fashion as part of the disconnection process, and regulator circuit 16 continues its output power regulation during ramp down until the contactors 26 are verified as open.

Figure 12:
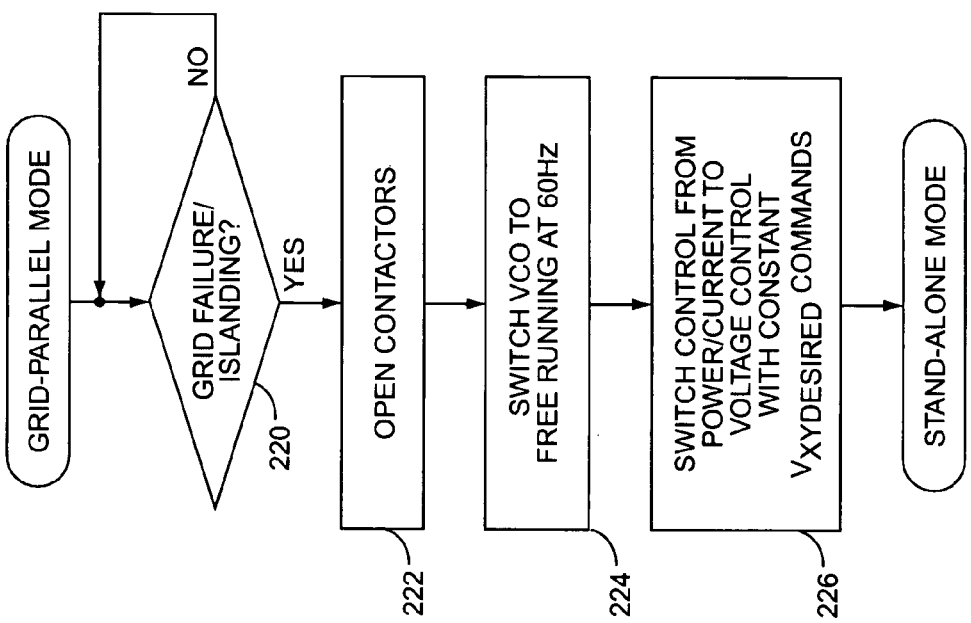
FIG. 12 is a diagram of exemplary processing logic for mode switching from a grid-connected mode of inverter operation to a stand-alone mode of inverter operation.

FIG. 12 illustrates that instead of transitioning to Idle mode from the Grid Parallel mode, inverter 10 can transition from Grid Parallel mode to Stand Alone mode, wherein it maintains its output voltage based on internally referenced control values. Such a transition can be triggered responsive to a number of initiating events, such as user command input, detection of grid failure or abnormal grid conditions, or detection of an island condition (Step 220). If a triggering event or condition is detected, processing logic commands contactors 26 to open and thereby disconnect inverter 10 from grid 24 (Step 222). Assuming that contactor opening is verified, switchover to Stand Alone mode is effected by switching the PLL's Voltage Controlled Oscillator (VCO) from being grid-referenced to being free running at 60 Hz, or any other desired frequency, e.g., 50 Hz, that is consistent with the inverter's load requirements (Step 224). Further, the inverter's regulation control is switched from the current/power regulation control of regulator 16, to the voltage regulation control of voltage control circuit 132, wherein the inverter's output is regulated substantially to maintain a desired $V_{OUT}$ (Step 226).

That is, in Stand Alone mode, voltage control circuit 132 controls the output voltage of inverter 10 according to internally generated values $V_{XDESIRED}$ and $V_{YDESIRED}$ that represent the desired output voltage of inverter 10 and these values are substituted for the $V_{XGRID}$ and $V_{YGRID}$ values that are input to summing circuits 140 during Synchronization and Grid Parallel modes of operation. The desired values can be fixed to default values or can be configurable, and can be generated by the timing/mode control circuit 130, or by another control element in control circuit 14. In an exemplary embodiment, the desired voltage for Stand Alone mode is embodied as a stored value that is accessed as part of the computer program used to carry out the above processing logic.

Figure 13:
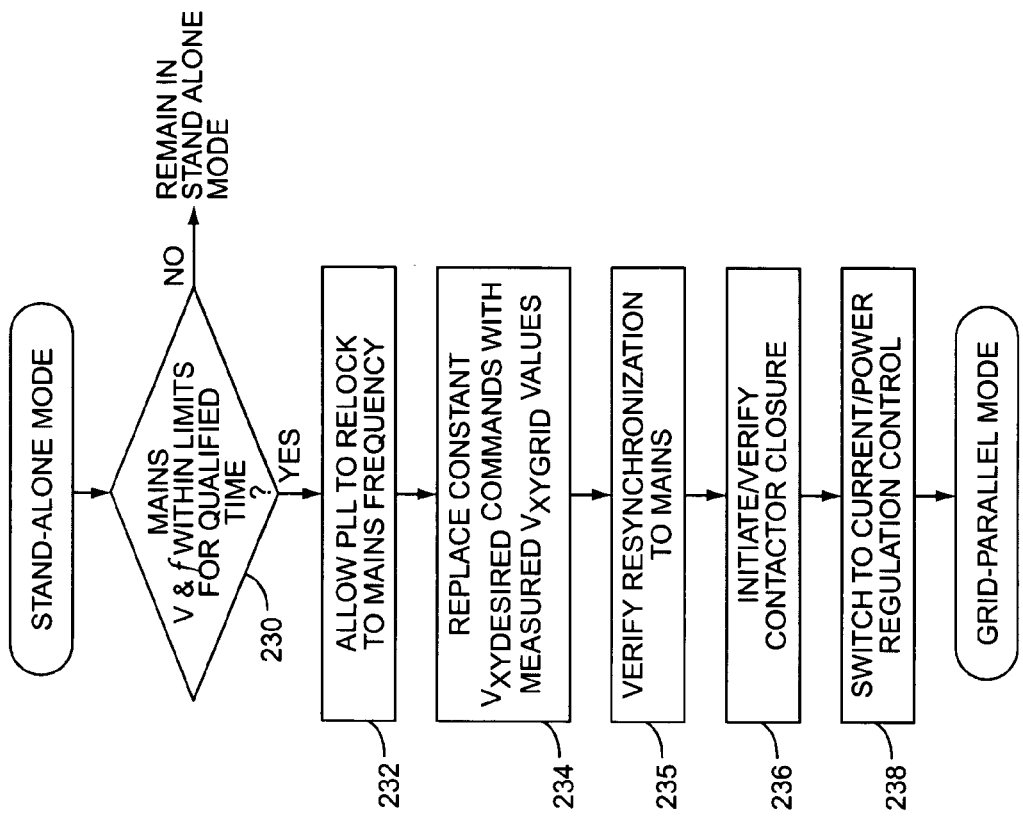
FIG. 13 is a diagram of exemplary processing logic for mode switching from a stand-alone mode of operation to a grid-connected mode of operation.

FIG. 13 illustrates complementary mode control processing logic wherein inverter 10 is transitioned from Stand Alone mode back to Grid Parallel mode responsive to detecting that grid 24 has returned to nominal operation. Processing begins with verifying that grid 24 is stable (Step 230), e.g., it has remained within defined operating limits for a defined period of time—see UNDERWRITER'S LABORATORIES (UL) Standard 1741 for exemplary time qualifications and operating limits that can be applied to the grid 24. If grid 24 is not stable, inverter 10 remains in Stand Alone mode. If grid 24 is stable, control logic transitions inverter 10 from Stand Alone mode back to Grid Parallel mode based on re-synchronizing to grid 24. Thus, the inverter's PLL is relocked to the mains frequency of grid 24 (Step 232). Further, the inverter's output voltage regulation is changed from regulation according to the Stand Alone references ($V_{XDESIRED}$, $V_{YDESIRED}$) to regulation according to the grid's x-y fundamental voltage components as measured by the inverter 10 ($V_{XGRID}$, $V_{YGRID}$) (Step 234). Once the inverter's output voltage is detected as substantially matching the ac mains voltage of grid 24, i.e., once re-synchronization to the grid is verified (Step 235), contactor closure is initiated and verified as described before (Step 236), and regulation control of inverter 10 is switched over to the output current/power regulation control provided by regulator 16 (Step 238).

The present invention thus provides exemplary mode control that transitions inverter 10 from its Idle Mode to Grid Parallel or Stand Alone modes as needed or desired, and transitions it from Grid Parallel mode to Stand Alone or Idle mode as needed or desired. Further, inverter 10 can be configured such that it transitions from Stand Alone mode to Idle mode, or to Grid Parallel mode, as needed or desired. As part of these exemplary mode control operations, the inverter's exemplary processing logic provides orderly disconnect and shutdown of the inverter. Broadly, then, the present invention provides an exemplary method and apparatus for power inverter synchronization and, as such, is not limited by the foregoing details, which can be varied as needed or desired. Indeed, the present invention is limited only by the following claims and their reasonable equivalents.

What is claimed is:

1. A method of controlling interconnection of a power inverter with an electrical system, the method comprising:
   controlling an inverter voltage to match an electrical system voltage;
   detecting synchronization of the inverter voltage with the electrical system voltage based on calculating a voltage error between x-y phasor components of the inverter and electrical system voltages; and
   commanding contactor closure to interconnect the power inverter with the electrical system responsive to detecting synchronization.

2. The method of claim 1, further comprising verifying contactor closure by monitoring one or more feedback signals.

3. The method of claim 2, further comprising changing the inverter from a voltage regulation control mode to a power regulation control mode responsive to verifying contactor closure.

4. The method of claim 2, wherein verifying contactor closure by monitoring one or more feedback signals comprises monitoring a contactor armature signal.

5. The method of claim 2, wherein verifying contactor closure by monitoring one or more feedback signals comprises measuring harmonic current flow between the inverter and the electrical system.

6. The method of claim 5, wherein measuring harmonic current flow between the inverter and the electrical system comprises generating a measurement value based on filtering a measured current signal, and comparing the measurement value to a closure detection threshold.

7. The method of claim 1, further comprising disconnecting from the electrical system by:
   ramping down inverter power; and
   commanding contactor opening to disconnect the inverter from the electrical system responsive to determining that the inverter power is below a defined threshold.

8. The method of claim 1, further comprising transitioning from a synchronization mode of operation comprising regulating the inverter voltage to substantially match the electrical system voltage to a grid-connected mode of operation comprising regulating an output power of the power inverter according to desired output power values.

9. The method of claim 8, further comprising transitioning from the grid-connected mode of operation to a stand-alone mode of operation by commanding contactor opening, verifying contactor opening, and changing to the stand-alone mode of operation by regulating the inverter voltage to substantially match an internal voltage reference of the power inverter.

10. The method of claim 1, wherein controlling the inverter voltage to match the electrical system voltage comprises referencing an x-y coordinate frame to the electrical system voltage by locking to a phase and frequency of the electrical system voltage, calculating the x-y phasor components of the inverter and electrical system voltages based on the x-y coordinate frame, and adjusting the inverter voltage to reduce a difference between the x-y phasor components.

11. The method of claim 10, wherein calculating the x-y phasor components of the inverter and electrical system voltages comprises calculating x-y phasor components for single-phase inverter and electrical system voltages.

12. The method of claim 11, wherein calculating the x-y phasor components for the single-phase inverter and electrical system voltages comprises integrating in-phase (x) and quadrature (y) samples of the inverter and electrical system voltages over half-cycles of a fundamental waveform period.

13. The method of claim 1, wherein controlling the inverter voltage to match the electrical system voltage comprises adjusting the inverter voltage to reduce a difference between the x-y phasor components of the inverter and electrical system voltages.

14. A control circuit to control interconnection of a power inverter with an electrical system, the control circuit comprising:
   a regulator circuit to control an inverter voltage to match an electrical system voltage by measuring x-y phasor components of the inverter voltage and the electrical system voltage;

a synchronization detection circuit to detect synchronization of the inverter voltage with the electrical system voltage by calculating a voltage error based on the x-y phasor components; and a contactor control circuit to command contactor closure to interconnect the power inverter with the electrical system responsive to detecting synchronization.

15. The control circuit of claim 14, further comprising a contactor monitoring circuit to verify contactor closure by monitoring one or more feedback signals.

16. The control circuit of claim 15, wherein the regulator circuit is configured to change from a voltage-control mode to a current-control mode responsive to verifying contactor closure.

17. The control circuit of claim 15, wherein the contactor monitoring circuit verifies contactor closure by measuring harmonic current flow between the inverter and the electrical system.

18. The control circuit of claim 15, wherein the contactor monitoring circuit verifies contactor closure by monitoring a contactor armature signal.

19. The control circuit of claim 14, wherein the contactor control circuit is configured to disconnect from the electrical system by:
   ramping down inverter power; and
   commanding contactor opening to disconnect the inverter from the electrical system responsive to determining that the inverter power is below a defined threshold.

20. The control circuit of claim 14, wherein the regulator circuit is configured to control the inverter voltage to match the electrical system voltage by referencing an x-y coordinate frame to the electrical system voltage based on locking to a phase and frequency of the electrical system voltage, measure the x-y phasor components of the inverter and electrical system voltages based on the x-y coordinate frame, and adjust the inverter voltage to reduce a difference between the x-y phasor components.

21. The control circuit of claim 20, wherein the regulator circuit is configured as a single-phase regulator circuit that measures x-y phasor components for single-phase inverter and electrical system voltages.

22. The control circuit of claim 21, wherein the regulator circuit is configured to measure the x-y phasor components for single-phase inverter and electrical system voltages by integrating in-phase (x) and quadrature (y) samples of inverter and electrical system voltages over half-cycles of a fundamental waveform period.

23. The control circuit of claim 14, wherein the regulator circuit is configured to adjust the inverter voltage to reduce a difference between the x-y phasor components of the inverter and electrical system voltages.

24. A power inverter including a control circuit to control interconnection of a power inverter with an electrical system, the control circuit comprising:
   a regulator circuit to control an inverter voltage to match an electrical system voltage by measuring x-y phasor components of the inverter voltage and the electrical system voltage;
   a synchronization detection circuit to detect synchronization of the inverter voltage with the electrical system voltage by calculating a voltage error based on the x-y phasor components; and
   a contactor control circuit to command contactor closure to interconnect the power inverter with the electrical system responsive to detecting synchronization.

25. The power inverter of claim 24, wherein the contactor control circuit is configured to disconnect from the electrical system by:
   ramping down inverter power; and
   commanding contactor opening to disconnect the inverter from the electrical system responsive to determining that the inverter power is below a defined threshold.

26. The power inverter of claim 24, wherein the regulator circuit is configured to control the inverter voltage to match the electrical system voltage by referencing an x-y coordinate frame to the electrical system voltage based on locking to a phase and frequency of the electrical system voltage, measure the x-y phasor components of the inverter and electrical system voltages based on the x-y coordinate frame, and adjust the inverter voltage to reduce a difference between the x-y phasor components.

27. The power inverter of claim 26, wherein the regulator circuit is configured as a single-phase regulator circuit that measures x-y phasor components for single-phase inverter and electrical system voltages.

28. A computer readable medium storing a computer program to control interconnection of a power inverter with an electrical system, the computer program comprising:
   program instructions to control an inverter voltage to match an electrical system voltage;
   program instructions to detect synchronization of the inverter voltage with the electrical system voltage based on calculating a voltage error between x-y phasor components of the inverter and electrical system voltages; and
   program instructions to command contactor closure to interconnect the power inverter with the electrical system responsive to detecting synchronization.

29. The computer readable medium storing the computer program of claim 28, further comprising program instructions to verify contactor closure by monitoring one or more feedback signals.

30. The computer readable medium storing the computer program of claim 29, further comprising program instructions to change the inverter from a voltage-control mode to a current-control mode responsive to verifying contactor closure.

31. The computer readable medium storing the computer program of claim 29, wherein the program instructions to verify contactor closure by monitoring one or more feedback signals comprise program instructions to measure harmonic current flow between the inverter and the electrical system.

32. The computer readable medium storing the computer program of claim 29, wherein the program instructions to verify contactor closure by monitoring one or more feedback signals comprise program instructions to monitor a contactor armature signal.

33. The computer readable medium storing the computer program of claim 28, further comprising program instructions to disconnect from the electrical system by ramping down inverter power, and commanding contactor opening to disconnect the inverter from the electrical system responsive to determining that the inverter power is below a defined threshold.

34. The computer readable medium storing the computer program of claim 28, wherein the program instructions to control the inverter voltage to match the electrical system voltage comprise program instructions to reference an x-y coordinate frame to the electrical system voltage by locking to a phase and frequency of the electrical system voltage, calculate the x-y phasor components of the inverter and electrical system voltages based on the x-y coordinate frame, and adjust the inverter voltage to reduce a difference between the x-y phasor components.

35. The computer readable medium storing the computer program of claim 34, wherein the program instructions to calculate the x-y phasor components of the inverter and electrical system voltages comprise program instructions to calculate x-y phasor components for single-phase inverter and electrical system voltages.

36. The computer readable medium storing the computer program of claim 35, wherein the program instructions to calculate the x-y phasor components for the single-phase inverter and electrical system voltages comprise program instructions to integrate in-phase (x) and quadrature (y) samples of the inverter and electrical system voltages over half-cycles of a fundamental waveform period.

37. The computer readable medium storing the computer program of claim 28, wherein the program instructions to control the inverter voltage to match the electrical system voltage comprise program instructions to adjust the inverter voltage to reduce a difference between the x-y phasor components of the inverter and electrical system voltages.

38. A method of connecting an initially disconnected power inverter with an electrical system, the method comprising:
locking a phase and frequency of an inverter voltage to an electrical system voltage, and adjusting the inverter voltage to approximate the electrical system voltage;
commanding contactor closure to connect the inverter to the electrical system responsive to determining that the inverter voltage substantially matches the electrical system voltage; and
verifying contactor closure by measuring harmonic current flow between the inverter and the electrical system.

39. The method of claim 38, wherein measuring harmonic current flow between the inverter and the electrical system comprises generating a measurement signal corresponding to current flow between the inverter and the electrical system.

40. The method of claim 39, wherein verifying contactor closure comprises determining whether the measurement signal is above a defined threshold.

41. The method claim 39, wherein generating the measurement signal includes filtering a current measurement signal using an n-point moving average filter.

42. The method of claim 38, further comprising regulating the inverter voltage under feedback control to approximate the electrical system voltage.

43. The method of claim 42, wherein regulating the inverter voltage under feedback control includes calculating x-y phasor components of the inverter and electrical system voltages and determining whether the inverter voltage substantially matches the electrical system voltage based on the x-y phasor components.

44. The method of claim 43, further comprising generating x-y reference signals based on the electrical system voltage for calculation of the x-y phasor components.

45. A method of controlling interconnection of a power inverter with an electrical system, the method comprising:
controlling an inverter voltage to match an electrical system voltage based on comparing x-y phasor components of the inverter voltage with x-y phasor components of the electrical system voltage;
detecting synchronization of the inverter voltage with the electrical system voltage; and
commanding contactor closure to interconnect the power inverter with the electrical system responsive to detecting synchronization.

46. The method of claim 45, further comprising changing from controlling the inverter voltage to controlling real and reactive inverter power responsive to verifying contactor closure.

47. The method of claim 45, further comprising disconnecting from the electrical system by:
ramping down inverter power; and
commanding contactor opening to disconnect the inverter from the electrical system responsive to determining that the inverter power is below a defined threshold.

48. The method of claim 45, further comprising transitioning from a synchronization mode of operation wherein the power inverter regulates its output voltage to match the electrical system voltage to a grid-connected mode of operation wherein the power inverter regulates its real and reactive output power according to desired output power values.

49. The method of claim 48, further comprising transitioning from the grid-connected mode of operation to a stand-alone mode of operation by commanding contactor opening, verifying contactor opening, and changing to the stand-alone mode of operation wherein the power inverter regulates its output voltage to match a reference voltage of the power inverter.

50. The method of claim 45, wherein controlling an inverter voltage to match an electrical system voltage based on comparing x-y phasor components of the inverter voltage with x-y phasor components of the electrical system voltage comprises:
referencing an x-y coordinate frame to the electrical system voltage by locking to a phase and frequency of the electrical system voltage;
calculating the x-y phasor components of the inverter and electrical system voltages based on the x-y coordinate frame; and
adjusting the inverter voltage to reduce a difference between the x-y phasor components.

51. The method of claim 50, wherein calculating the x-y phasor components of the inverter and electrical system voltages comprises calculating x-y phasor components for single-phase inverter and electrical system voltages.

52. The method of claim 51, wherein calculating the x-y phasor components for the single-phase inverter and electrical system voltages comprises integrating in-phase (x) and quadrature (y) samples of the inverter and electrical system voltages over half-cycles of a fundamental waveform period.

* * * * *